Nov. 3, 1964

H. A. BACKUS ETAL 3,155,026

PHOTOGRAPHIC APPARATUS

Filed May 31, 1960

INVENTORS.
HAROLD A. BACKUS
FRANK A. RUHMANN

*Carl Fissell Jr*
AGENT

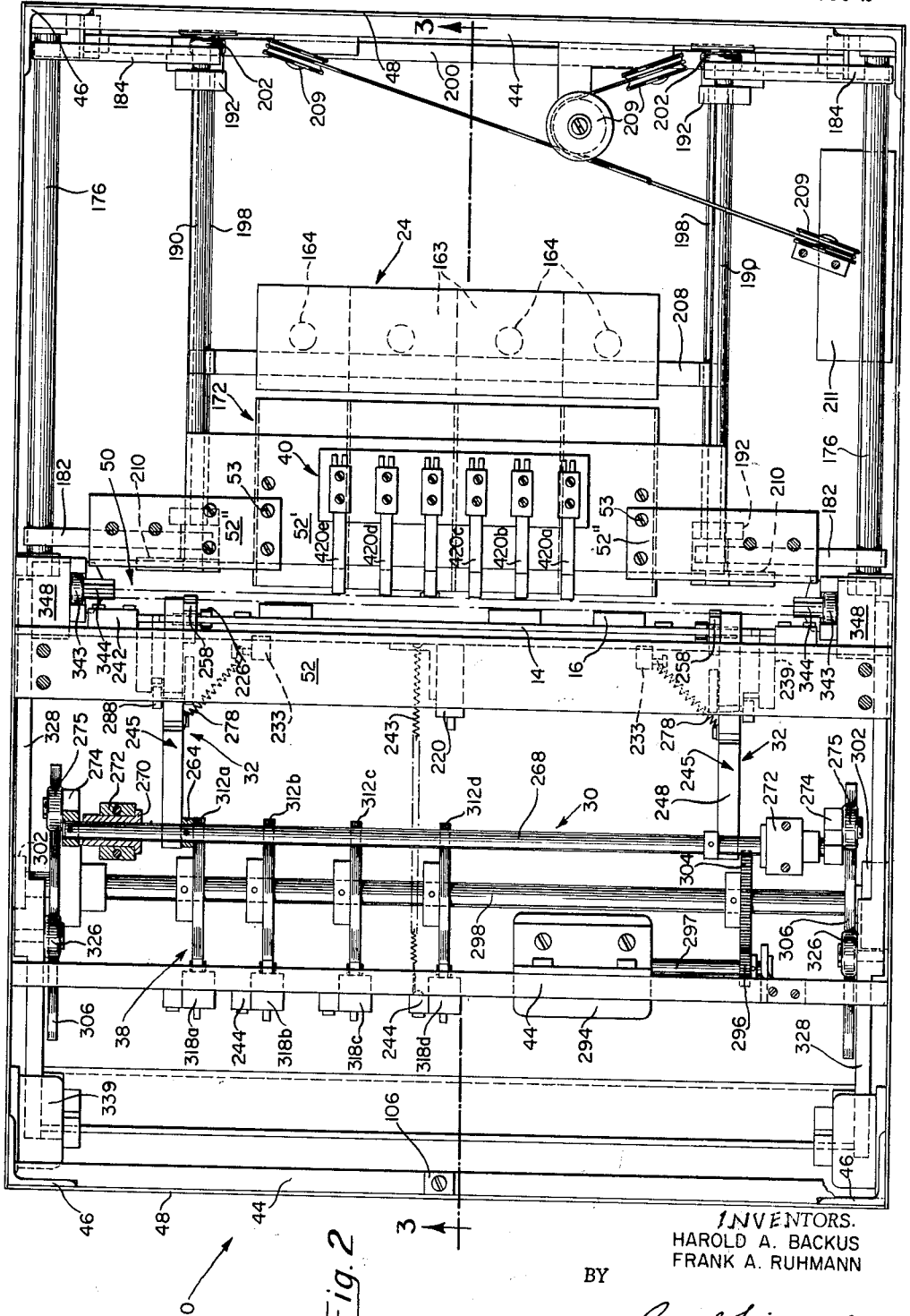

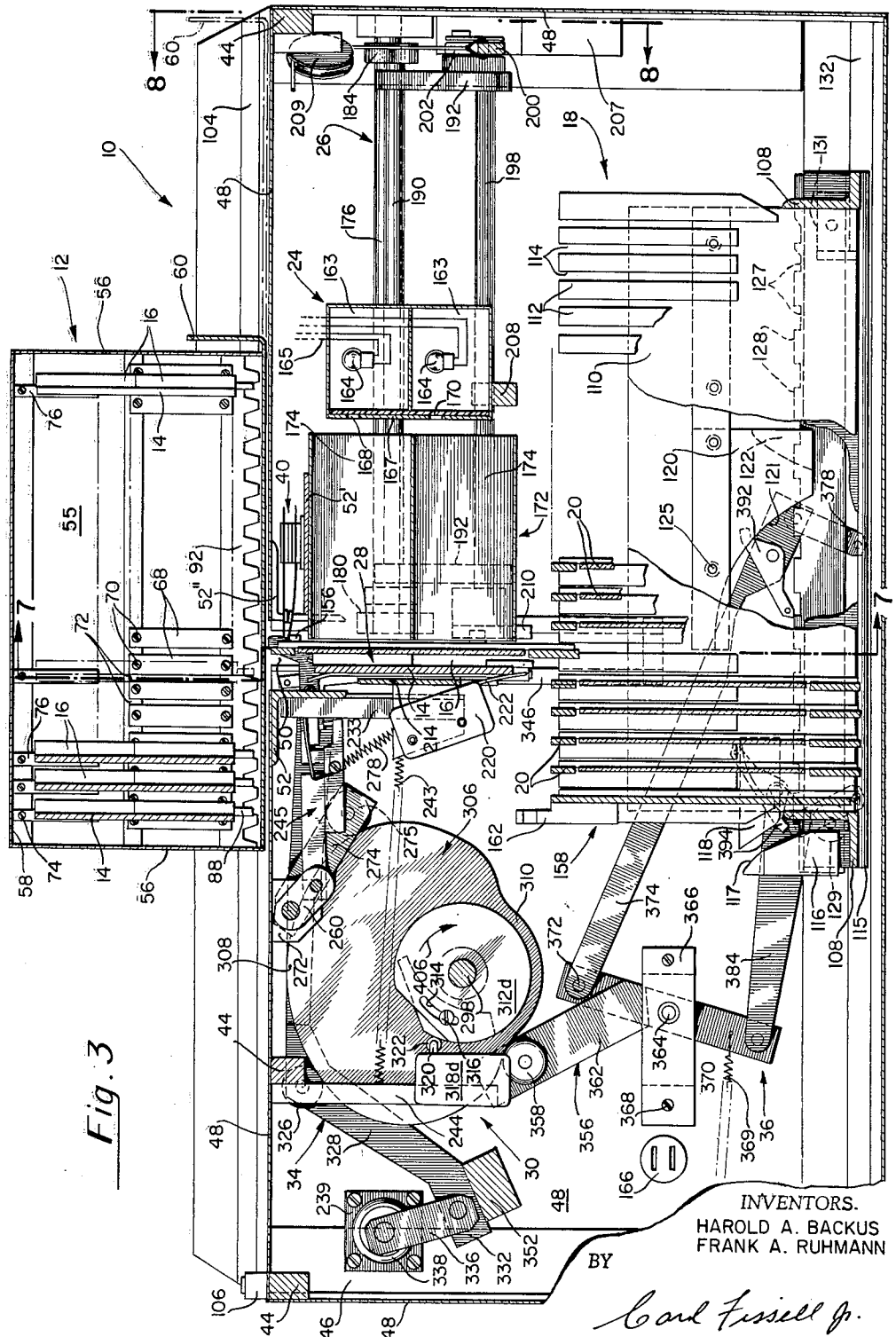

INVENTORS.
HAROLD A. BACKUS
FRANK A. RUHMANN
BY
Carl Fissell Jr.
AGENT

INVENTORS.
HAROLD A. BACKUS
FRANK A. RUHMANN
BY
*Carl Fissell Jr.*
AGENT

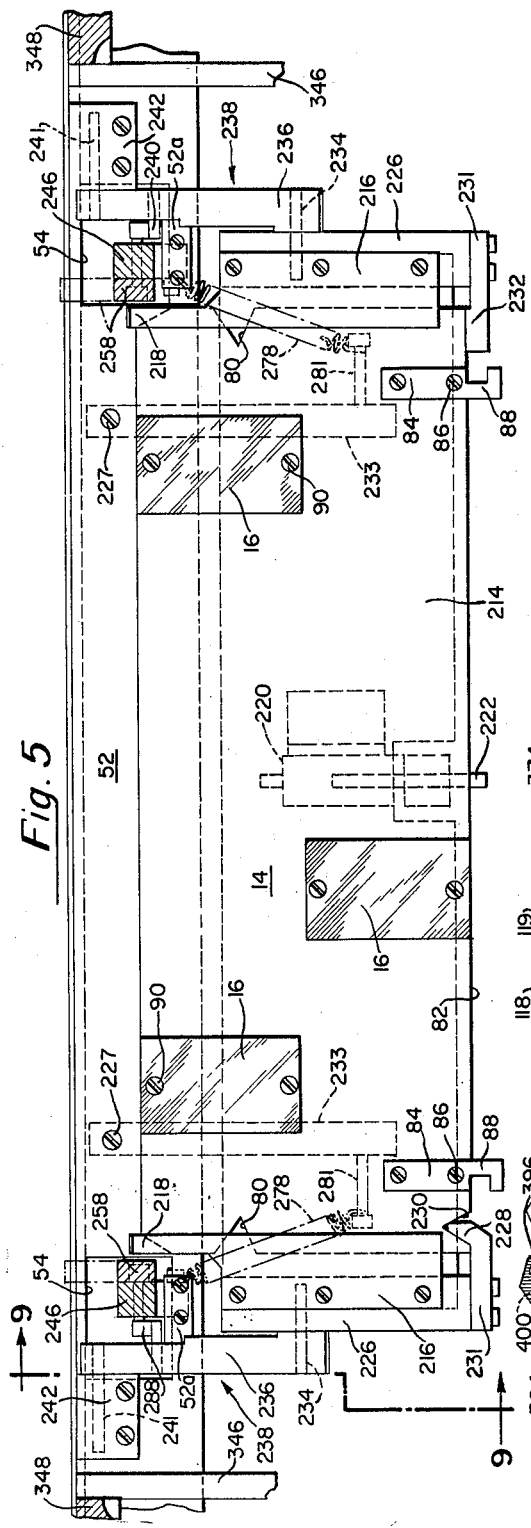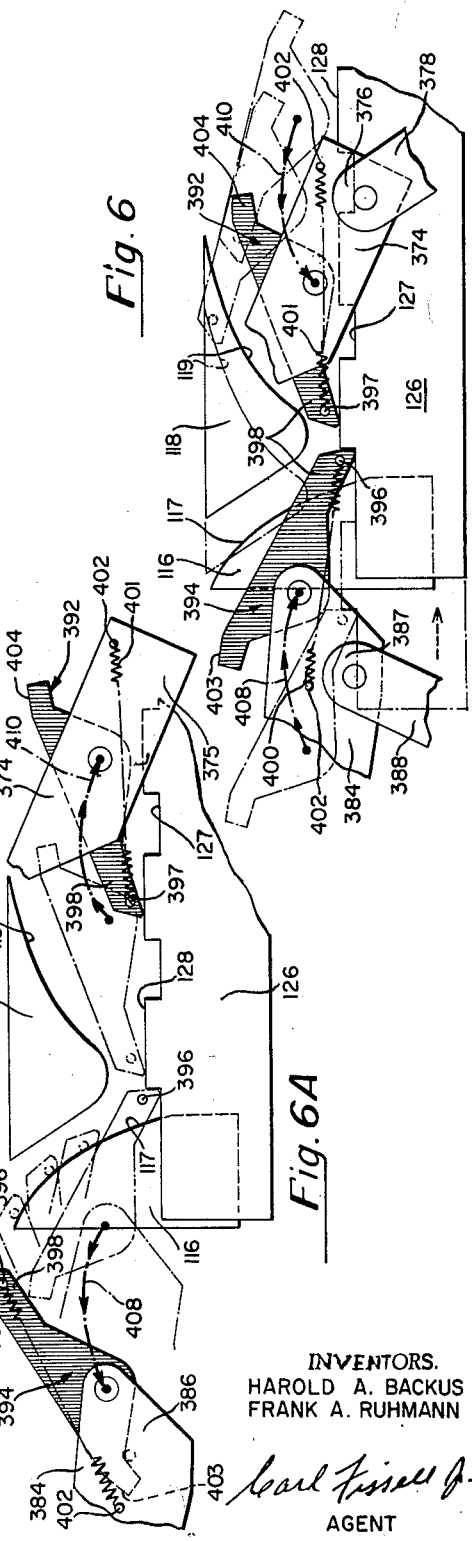

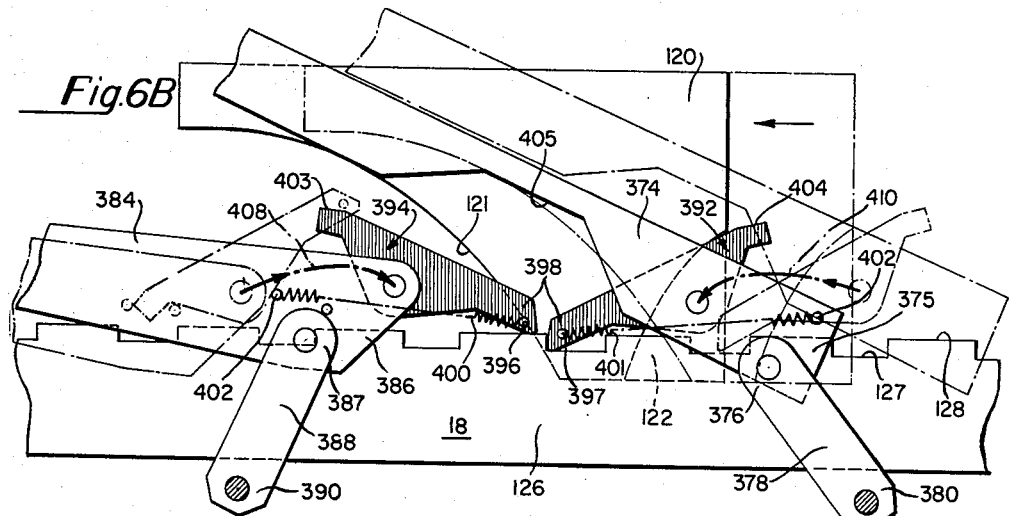
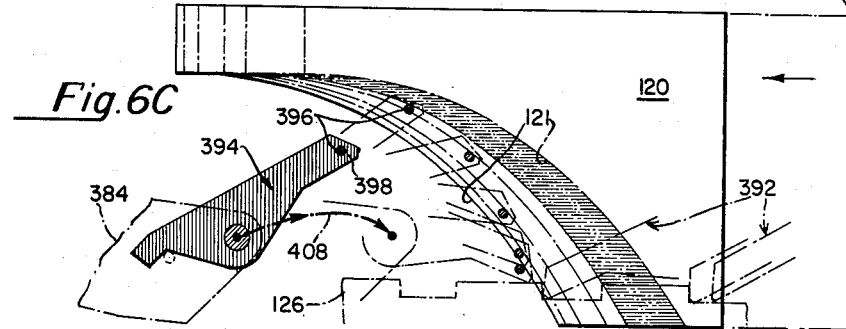
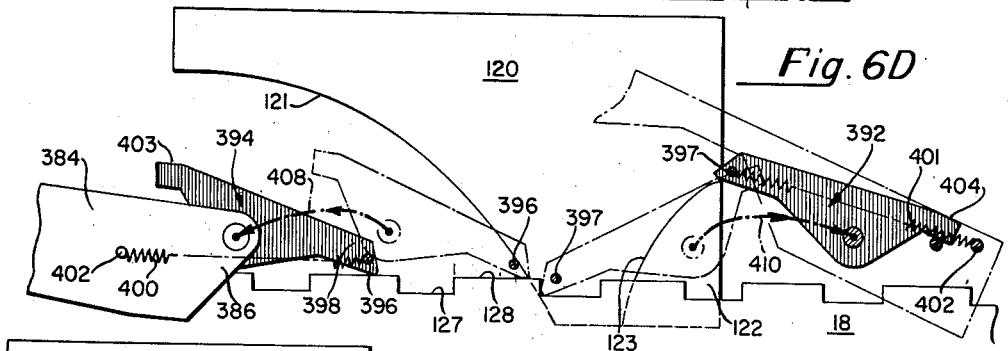

Nov. 3, 1964 H. A. BACKUS ETAL 3,155,026
PHOTOGRAPHIC APPARATUS
Filed May 31, 1960 15 Sheets-Sheet 9

INVENTORS.
HAROLD A. BACKUS
FRANK A. RUHMANN
BY
*Carl Fissell Jr.*
AGENT

Nov. 3, 1964  H. A. BACKUS ETAL  3,155,026
PHOTOGRAPHIC APPARATUS
Filed May 31, 1960  15 Sheets-Sheet 10
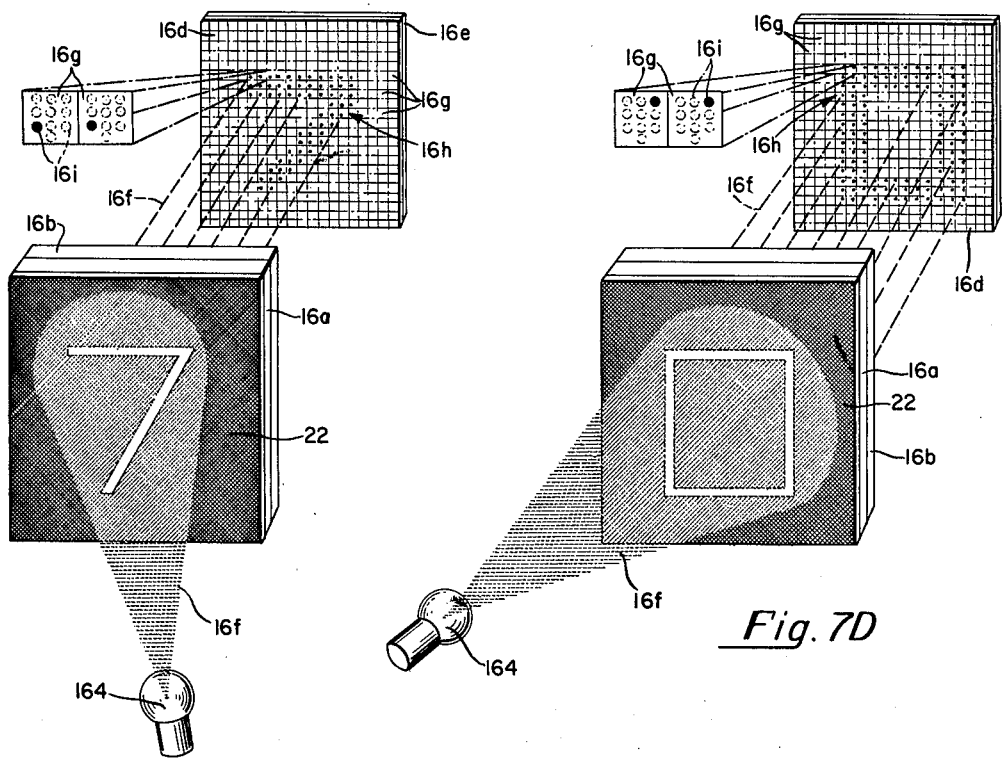
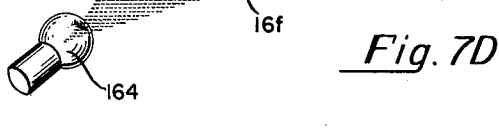
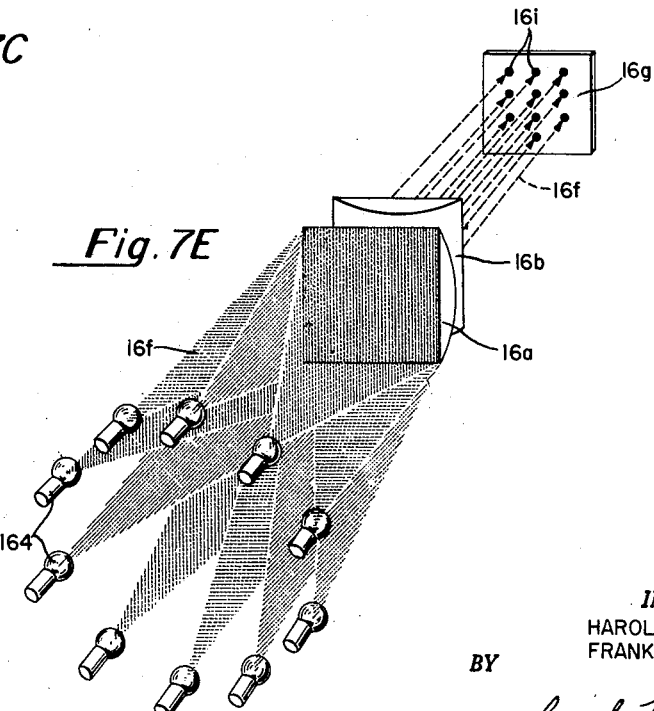
INVENTORS.
HAROLD A. BACKUS
FRANK A. RUHMANN
BY
Carl Fissell Jr.
AGENT

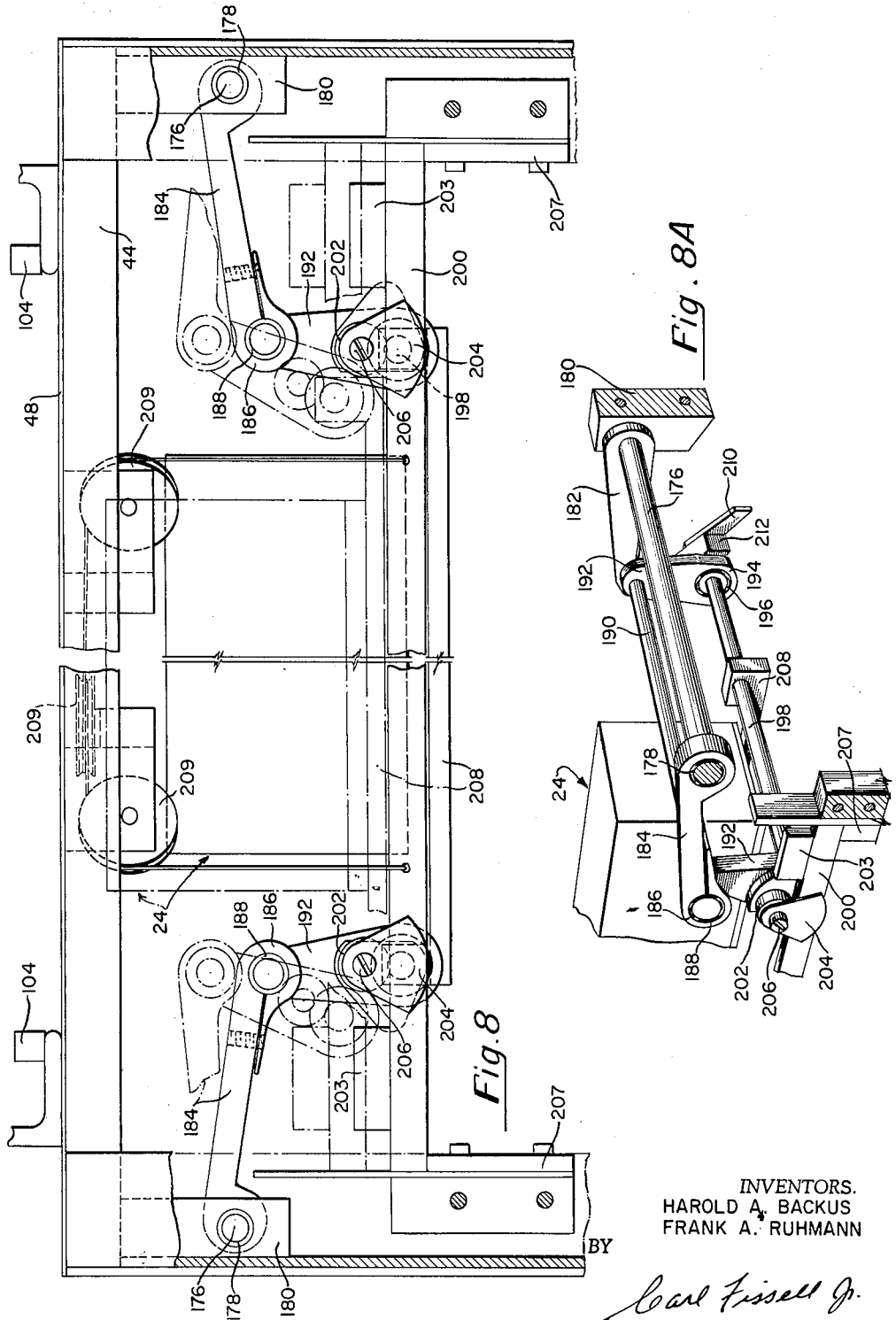

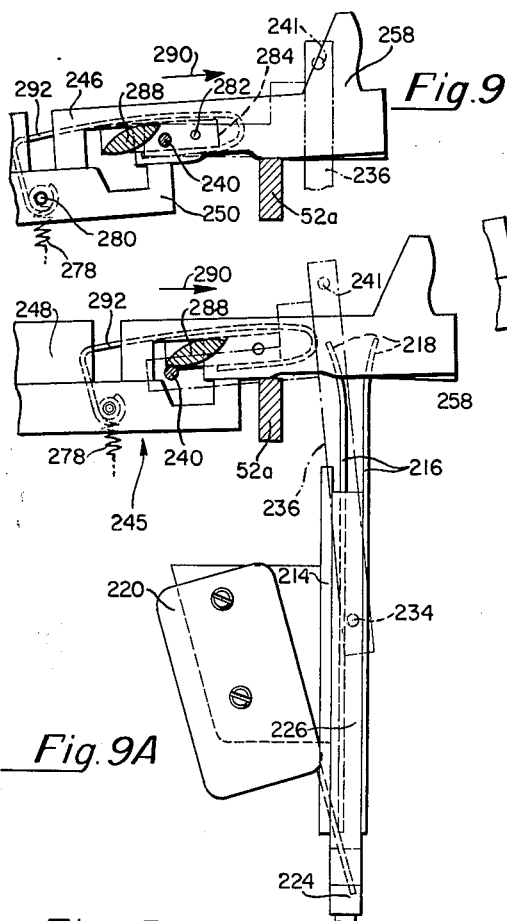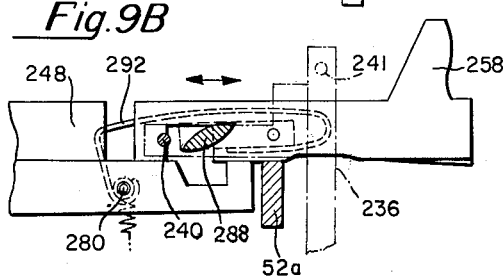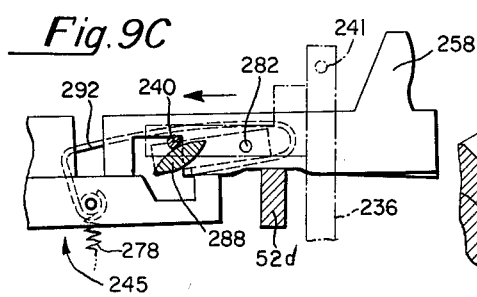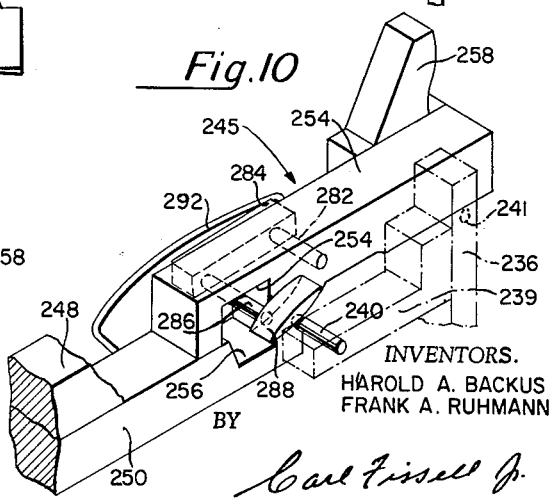

INVENTORS.
HAROLD A. BACKUS
FRANK A. RUHMANN
AGENT

INVENTORS.
HAROLD A. BACKUS
FRANK A. RUHMANN

AGENT

United States Patent Office 3,155,026
Patented Nov. 3, 1964

3,155,026
PHOTOGRAPHIC APPARATUS
Harold A. Backus, Wynnewood, and Frank A. Ruhmann, Philadelphia, Pa., assignors to Burroughs Corporation, Detroit, Mich., a corporation of Michigan
Filed May 31, 1960, Ser. No. 32,730
17 Claims. (Cl. 95—73)

This invention relates in its broadest aspects to photographic apparatus and generally to apparatus of the photographic type for producing multiple contact exposures from a plurality of different negative originals. More specifically, the invention pertains to photographic printing apparatus wherein one or more photo-sensitized members are disposed in close contact with a negative or other image bearing members so as to be automatically subjected to actinic light passing through the negative to impinge upon the photo-sensitized members thereby producing a latent image of each negative on the photo-sensitized member. With even more particularity, the invention has to do with automatic photographic printing apparatus for exposing a photo-sensitized lenticulated display unit to light through a negative, the light being automatically positionable with respect to the display unit to produce a series of discrete angularly oriented latent images of a plurality of information messages or data on the lenticular member thus to provide a unitary multiple display image thereon.

While the machine of the present invention is adaptable for printing photographically by means of conventional photographic materials such as negative films, and is capable of printing from half tone, line negatives and the like, it has features which are especially adapted for the exposure of relatively rigid photo-sensitized members. For example, where it is desired to photographically reproduce a relatively large number of exceedingly small elemental bits of information, for example, on a photo-sensitized lenticulated surface, by exposing such surface to light rays from a multi-positionable light source thus to form a latent image on myriad elemental surfaces of the lenticulated surface, it is required that the light source and the photo-sensitized surface constantly bear the same physical relationship with each other throughout the varying exposures, i.e., the focal distance must remain constant for every exposure. Heretofore, the only practical, readily available apparatus for accomplishing this purpose comprised a rather complicated and inefficient multi-part assembly including a photo-sensitized surface, a masking unit, a message or information unit, a supporting frame and a light source in the form of a fixture or jig. Multiple exposures were made using the aforementioned equipment by shifting the light source and negative relative to the photo-sensitized member after each exposure. Thus it was necessary for the whole assembly to be disassembled and reassembled for each new position of the light source and thereafter the lenticular surface was again exposed to light as before. All of these operations were performed by hand which often made the apparatus exceedingly slow, relatively inefficient and subject to a relatively high degree of error both in composition, focus, resolution and general accuracy.

In the production of so-called lenticular optical message display units, use is made of "crossed lenticulars," i.e., the half cylinders of one plane of lenses are perpendicularly arranged relative to the half cylinders of another and contiguous plane of lenses.

The terms "lenticule," "lenticular," "lenticulated," etc. as used herein define lenses having such small dimensions that they focus light waves on single elemental picture areas thereof which may be placed sufficiently close to other picture areas that the eye merges them into a composite and complete uninterrupated image when viewed from a reasonable distance. The word "negative" is used herein in an illustrative sense because whether the original or master is a negative or positive will depend both upon the nature of the photo-sensitive material and the use to which the reproduction is to be put. A photo-sensitive emulsion is disposed behind the lenticulated lens array in such a manner that light from a point source is obliged to travel through both of the lens surfaces to impinge upon the emulsion. After the emulsion has been exposed to light it is developed in a conventional dark room thus to provide a matrix of dots, e.g., relatively tiny opaque spots in the area of each crossed lenticular, each one of which represents the developed portion of the emulsion, which, in this negative form, represents the original images carried by the stencil-negative.

The apparatus to which the present application refers provides means for producing multiple selective local exposures on a display unit of the lenticular lens type in accordance with a master image (negative or positive) so that thereafter the latent image bearing member can be developed in the conventional manner leaving certain exposed and unexposed portions thus to produce one or more separate images suitable for viewing by the transmission of light therethrough or by reflected light depending upon the manner in which the image bearing member is to be employed. The apparatus of the present invention permits closely controlled exposures of different magnitude and time to be made without danger of relative movement between or separation of the original from the photo-sensitized member thus providing for a high degree of image sharpness and resolution.

The display units fabricated in accordance with the present invention, whether they be of digital or alphanumeric message type, are quite similar to the display units described and claimed in two copending patent applications in the name of James A. Ogle, for "Multiple Image Display System," Serial No. 580,381, filed April 24, 1956, now Patent No. 2,981,140, and "Selective Control Screen System," Serial No. 605,597, filed August 22, 1956, now Patent No. 2,981,941, and both assigned to the same assignee as the present invention.

The principal object of the present invention is to provide automatic photographic apparatus for accurately composing multiple images on photo-sensitized material.

It is another important object of the present invention to provide an automatically self-contained multiple image photographic exposure apparatus.

It is another object of the present invention to provide apparatus for automatically exposing to light a plurality of photo-sensitized message units without the requirement of assembly and disassembly of the negative and the photo-sensitized member relative to one another.

It is an additional object of the present invention to provide photographic printing apparatus which will automatically signal the operator when the primary light source is non-operative.

It is a further object of the present invention to provide apparatus for the creation of a photographically exposed light sensitized message display member, the precise data composition and format of which may be predetermined and varied without disassembly of the apparatus.

Another object of the invention is to provide photographic apparatus which makes it possible for the operator to change the format of the message units simply by repositioning the negative masters relative to the negative carrier.

In accordance with the above objects and as first briefly described herein, there is provided apparatus for automatically, repeatedly registering each one of a plurality of separate negative images with a photo-sensitized emulsion bearing member and thereafter repeatedly exposing the latter to actinic light from different angular directions thereby to produce a unitary viewable display having a plurality of latent images corresponding to the images of each one of the negatives.

The features of the invention which are believed to be novel are set forth with particularity in the following specification and the appended claims. The invention itself, however, both as to its organization and operation, together with further objects and advantages thereof may best be understood by reference to the following description taken in conjunction with the accompanying drawings in which:

FIG. 1 is a right side elevational view of apparatus embodying the invention with the covers removed to expose the interior of the apparatus;

FIG. 2 is a top plan view of the apparatus of the present invention, the view being taken along the line 2—2 of FIG. 1;

FIG. 3 is a transverse side elevational sectional view along the line 3—3 of FIG. 2;

FIG. 5 is a front elevational view, partially in section, along the line 5—5 of FIG. 1 illustrating a work piece carrier in exposure position;

FIGS. 6 through 6E are a series of detailed views of the negative carriage transport mechanism illustrating the mechanism in its various operating positions relative to the negative carrier;

FIGS. 7C and 7D are diagrammatic perspective views illustrating the dot pattern formation of the latent images of different messages;

FIG. 7E is a diagrammatic perspective view illustrating the displacement of the light source relative to a lenticular lens unit during the dot formation of a plurality of separate messages;

FIG. 8 is an elevational view along the line 8—8 of FIG. 3 illustrating the parallel bar mechanism for raising, lowering and transversely moving the light housing of the present inevntion;

FIG. 8A is a perspective view of one side of the parallel bar mechanism of FIG. 8;

FIGS. 9 and 9C are detailed sectional views along the line 9—9 of FIG. 5 of the work piece drive mechanism shown in its various operating positions and illustrating the camming mechanism for camming the work piece carrier against the negative carrier;

FIG. 10 is an isometric view of the mechanism of FIG. 9;

FIGS. 11 and 11A are fragmentary detail views of the work piece magazine transport mechanism illustrating the operative relationship of this mechanism with the special master and illustrating a work piece carrier selecting operation;

Figure 4A:
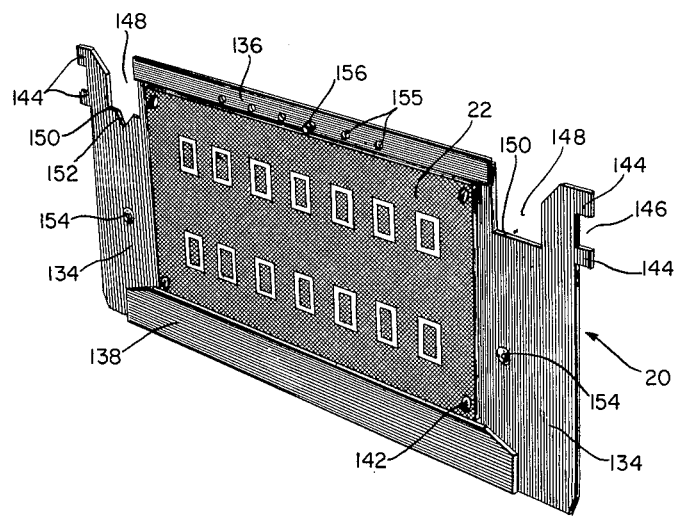
FIG. 4A is an isometric view of one of the negative carrying members of the device shown in FIG. 4.
Figure 4:
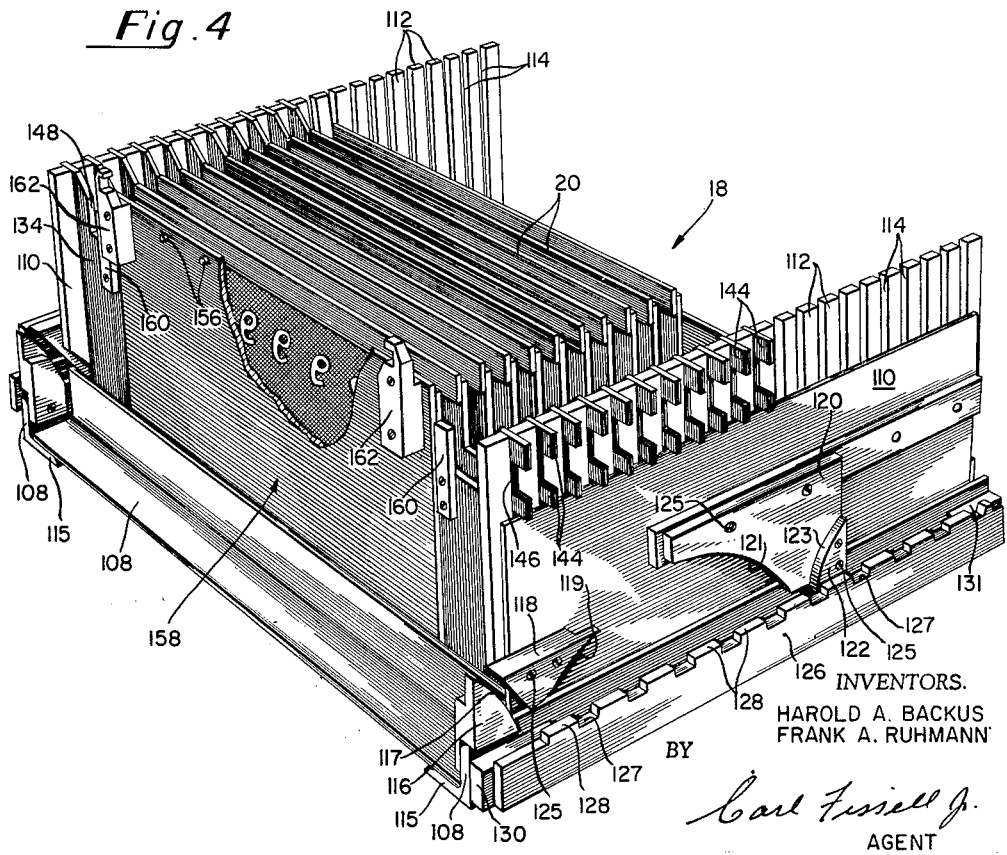
FIG. 4 is an isometric view of the negative carrier including a plurality of negative holders therein.

Considered briefly and generally the preferred embodiment of the present invention, as seen in FIG. 1, comprises automatic photographic exposure apparatus including a plurality of unitary sub-assemblies, certain ones of which can be removed from and inserted into the basic apparatus at will. More specifically, the present invention includes a substantially rectangular box-like structure forming a photographically light-tight housing 10. A demountable light-tight work piece carrier magazine 12, including a plurality of removable work piece carrying members 14 provided with one or more photo-sensitized work pieces 16, is operatively associated with the housing 10 in a manner such that the magazine 12 is movable over the top surface of the housing so as to position the work piece carrying members 14 relative thereto. A removable stencil-negative carrier magazine 18, including a plurality of stencil or negative master carrying members 20 each of which is or may be provided with one or more stencils or negatives 22, FIGS. 4 and 4a, is disposed within the housing 10 for rectilinear movement back and forth parallel to the longer dimension of the housing 10. A multi-positionable light source or lamphouse 24 is disposed within the housing 10 and is adapted to be moved, by means of a parallel bar mechanism 26, in a plane adjacent to and parallel with an exposure area 28 located in the upper center portion of the housing 10.

A main driving mechanism 30, including a conjointly movable upper magazine transfer and clamping mechanism 32, a middle negative carrier lifting mechanism 34, and a lower negative carrier transfer mechanism 36, respectively, permit the automatic withdrawal of a work piece carrying member 14 and a negative bearing member 20 from their respective magazines 12 and 18, and the registration of the two members within the exposure area 28 in a contact printing relationship. The light source 24 is adapted, by means of the parallel bar mechanism 26 in response to movement of a negative carrier into the exposure area 28, to be automatically and accurately moved into a position adjacent to the negative carrier and the work piece carrier thus to expose the work piece or pieces to light. An adjustably controlled and timed exposure is provided by means of a plurality of interval timing cams 38, FIG. 2, operably associated with the main driving mechanism 30 in cooperation with a bank of electrical switches 40, actuatable by each negative carrying member.

After each exposure is completed each negative carrier 20 is automatically replaced within the magazine 18 and a different negative carrier is positioned adjacent to the work piece carrying member 14 for the next exposure. This process is repeated until the negative magazine 18 has been completely exhausted or until the desired pattern of messages, i.e., negative images, has been transferred from the negatives to the photo-sensitized work pieces. The present apparatus is controlled i.e., turned "on" and "off," etc. by means of a plurality of electrical control syitches 42, FIG. 1, disposed adjacent the front of the machine and located along the upper right longitudinal frame member.

Light-Tight Housing

The present invention will now be described in greater detail with reference first to FIGS. 1–3B inclusive, which will be discussed simultaneously. It is seen that the housing assembly 10 includes a plurality of horizontal and vertical, relatively rigid, frame members 44 and 46, FIGS. 1 and 2, respectively, joined together in a suitable manner, as by bolts, not shown, to provide a relatively rigid, hollow, rectangular, box-like framework for supporting the apparatus to be described in detail subsequently herein. The house 10 is provided with a plurality of cover plates or members only the top, front back and right side cover members 48 being visible in FIGS. 1 and 3. The covers 48 are attached along their edge portions to the respective frame members 44 and 46 in any convenient manner, e.g., by screws, thus to provide a substantially light-tight unitary enclosure. The right-hand side of the housing 10 (FIG. 1) is hereinafter designated the front of the machine while the left-hand side is designated the rear or back of the machine. The cover or panel member for the right side of the apparatus, in a known manner, may be detachably removable to provide a means of ingress and egress for the negative magazine 18. The top cover member 48 is provided with an elongated rectangular aperture or slot 50, FIG. 3, therein, intermediate transverse supporting angle member 52 and the transverse supporting members 52' and 52'', FIG. 2, the latter two being joined together as a unitary structure by means of bolts 53. Aperture 50 provides an access opening into and through which work piece carrying members 14, as will be described shortly, may be moved from the work piece magazine 12 into the exposure area 28, within the housing 10, and back again into the magazine 18 at the end of each exposure. The transverse member 52 is provided with oppositely disposed openings located, one at each end thereof, only the opening 54 being visible in FIGS. 11 and 11a, for purposes to be described later on. A camming block 52a is disposed on each side of member 52 adjacent to and slightly above the rim of each opening 54. As seen in FIG. 2, each of the switches of the switch bank 40, which may be of leaf type, are mounted on the member 52' so that the actuator of each switch projects laterally a short distance across the access opening, for purposes to be described presently.

*Work Piece Magazine*

Figure 7:
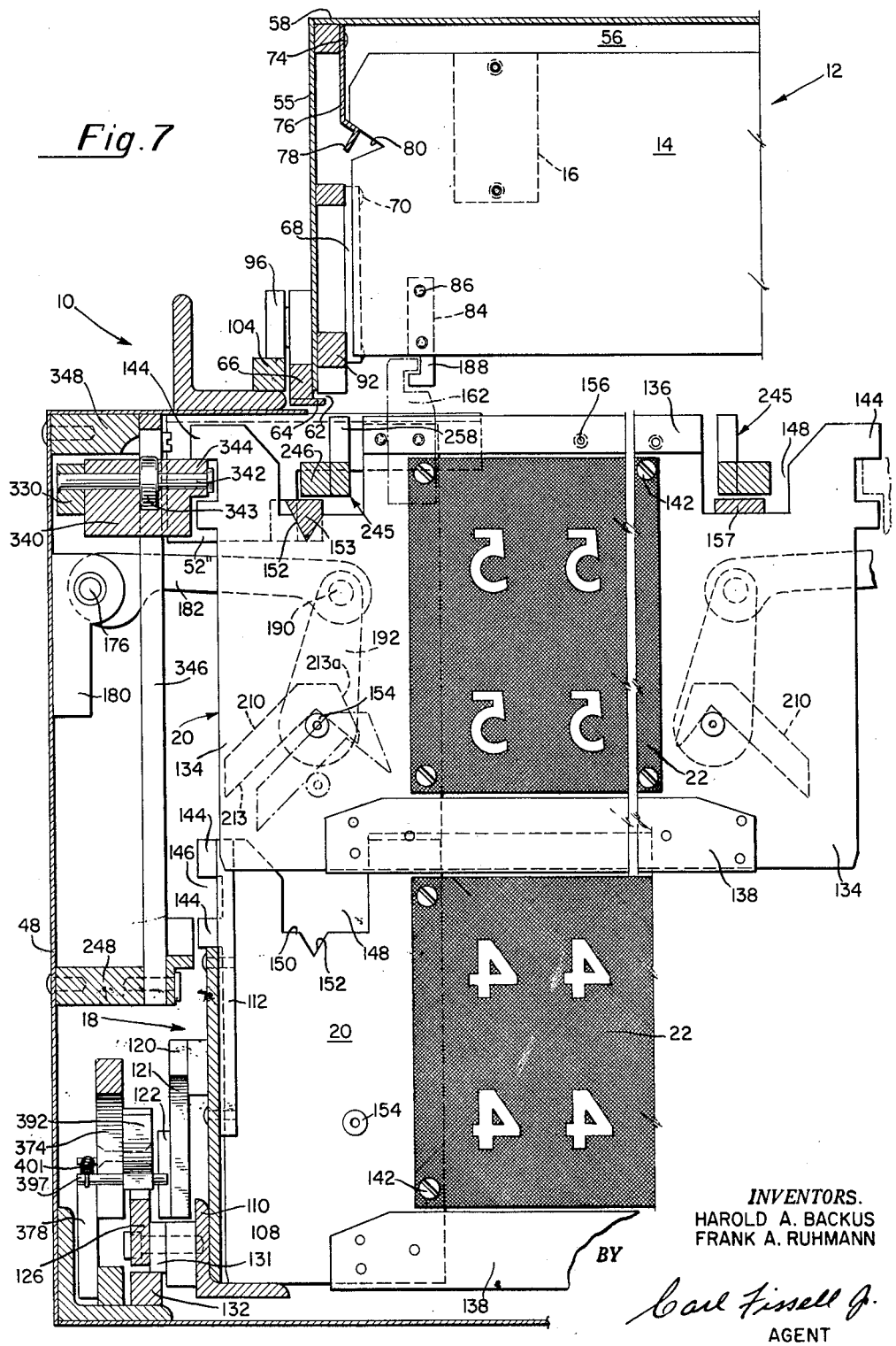
FIG. 7 is an elevational view, partially in section, along the line 7—7 of FIG. 3 illustrating one side of the parallel bar mechanism of the present invention in operating relation to the negative carrier and work piece carrier respectively.

The work piece magazine 12, as seen in FIGS. 1, 2 and 7, comprises a light-tight rectangular box-like assembly having side walls 55, front and rear walls 56, a top wall 58, and a removable dark slide 60, slidably receivable within the grooves 62 between the flange 64 and the longitudinal frames 66, FIG. 3. The projecting edge of the flange 64 adjacent the slide 60 may be provided with opaque material such as a thin felt strip, not shown, as a positive barrier against any stray or ambient light.

As seen clearly in FIGS. 3 and 7, each of the longer parallel side walls 55, of the work piece magazine 12, is provided with an upstanding row of elongated substantially rigid members 68 secured therealong, as by bolts or rivets 70, in parallel, spaced apart, side by side relation forming narrow slots 72 therebetween. Also attached at one end thereof, to the side walls 55 as by rivets 74, in a row adjacent to but located above and parallel to members 68, are a plurality of flexible spring members 76, one end of each of which is bowed outwardly terminating in a V tang or tab 78, disposed in interfering relation with a respective slot 72.

*Work Piece Carrier*

Each work piece carrying member 14, which is of substantially rectangular configuration, as shown most cleraly in FIG. 5, includes oppositely disposed notches 80, only the left-hand notch 80 being shown in FIG. 7. One of the longer parallel edge portions 82 (the bottom edge in FIGS. 5 and 7) of each work piece carrying member 14, is provided with two oppositely disposed elongated members 84, secured thereto as by bolts 86. The depending end of each member 84 includes a rectangular notch forming an L-shaped foot or boot 88. The members 84 are attached to the member 14 so that the boot ends face away from each other and toward the respective side wall of the housing 10, for purposes to be explained later on.

Each member 14 may be provided with one or more photo-sensitized members or work pieces 16 which may be secured thereto in any convenient manner as for example, by pressure sensitive adhesive, glue or screws 90. In the illustrated embodiment of the present invention, FIGS. 2 and 5, in order to simplify the drawings and to more readily facilitate an understanding of the apparatus only three work pieces have been shown. However, it is to be understood that a much greater number could be employed at the discretion of the operator. As is now apparent, the construction hereinabove set forth permits each of the work piece carrying members 14 to be detachably receivable within the slots 72, FIG. 3, and demountably held within the magazine 12 in side by side, parallel, spaced apart relation by the pressure of the spring members 76, FIG. 7, forcing their projecting tabs 78 into engagement with respective oppositely disposed notches 80 of each work piece carrying member. For purposes to be noted hereinafter, the notches 80 in each member 14 permit a degree of freedom to the work piece carrier with respect to the engaging spring members 76 such that the tangs 78 are not received fully within the notches 80 but permit the carriers 14 to hang somewhat loosely therefrom.

Adjacent the inner lower edges of the opposite parallel side walls 55 of the magazine 12, only one of which is shown in FIGS. 1, 3 and 7, there is provided a toothed rack member 92, which may be attached thereto by bolts 94, FIG. 1. Individual bearing members or rollers 96, FIGS. 1 and 7, are secured to side walls 54 at the rear of the magazine as by bolts 98. The forward portion of the magazine is provided with oppositely disposed skids, such as the rectangular blocks 100, FIG. 1, attached to the wall members by bolts 102, in a conventional manner. The bearings and skids permits the magazine 12 to be received on and slide back and forth over the oppositely disposed parallel guide rail members 104, FIGS. 1, 3 and 7, extending from front to rear along the top portion of housing 10. The skids produce sufficient frictional drag to prevent the magazine from moving too freely along the rails as to misorient the same with respect to the drive means to be described later on.

The rear or left hand portion of the housing 10, as viewed in FIG. 1, is provided with a stop or limit member such as the rectangular block 106, to limit the rearward excursion of the magazine 12 and so as to automatically position the same relative to the access opening 50. The forward portion of the assembly is provided with a stop plate (not shown) extending slightly forward of the top cover member thus to provide a forward limit for the magazine in its linear path of movement during operation of the present apparatus.

In the preferred embodiment, as herein disclosed, the magazine 12 is adapted to contain from one to eighteen work piece carrying members 14. This number is arbitrarily determined by the requirements of the particular lenticular optical display which is to be photographically reproduced and is not to be considered a limiting feature of the invention. Obviously, the number of carriers 14 may be varied at will to suit varying demands. It is to be noted that both the placement of the individual work pieces 16, e.g., the lenticular display units with their photo-sensitized emulsion thereon, as well as the loading of the work piece carriers 14 within the magazine 12 are performed in a dark room. After loading and with the dark slide 60 in the solid line position, FIG. 3, the magazine 12 is inverted so as to place the dark slide at the bottom of the assembly. The magazine is then positioned on the guides 104 and the member 60 is slid from its full line position to the position shown in dotted outline in FIG. 3, permitting the magazine to be automatically moved making the carriers available to the access opening 50 for withdrawal into the housing 10 in a manner to be explained shortly.

Stencil or Negative Magazine

The stencil or negative carriage 18, which as before-mentioned, is adapted to be incrementally movable forwardly and rearwardly internally of the housing 10, as is seen in FIG. 4, to comprise a substantially rectangular frame assembly which is structurally rigidified by the means of a plurality of L-shaped angle members 108, welded, bolted or otherwise suitably secured together to form a shallow pan-like structure provided with oppositely disposed parallel upstanding side wall members 110. Suitably attached to the inwardly facing surfaces of each side wall member and disposed in parallel, side by side, spaced apart relation, are a plurality of upstanding, relatively rigid, elongated members 112, forming slots 114, therebetween. The inwardly turned flange 115, FIGS. 4 and 7, of the opposite parallel angle members 108 provides a lower abutment, limit or stop for the negative carriers 20 when the latter are slid within the slots 114, as will appear more fully hereinafter. Disposed along opposite side walls of the carriage are a plurality of irregularly shaped cam members designated as rear cams 116 and 118, and front cams 120 and 122 respectively, the operation of which will be described hereinafter. Each cam member may be individually, adjustably mounted to the side wall 110, as by bolts 125, for movemnet toward or away from each other, as need be. The cams are shown in FIG. 4, adjustably positioned for the employment of eleven carrier members 20 in this preferred embodiment.

Paralleling the angle members 108 on each side of the box-like carriage 18 is an elongated member or bar 126, provided with a plurality of substantially rectangular castellation forming notches 127 and projections 128 in the upper surface thereof. In a manner to be explained presently, these castellations are operably associated with the lower driving carriage transfer linkage 36, earlier briefly referred to herein, for propelling the box-like negative magazine 18 forwardly and rearwardly of the housing 10. As shown in FIG. 1 at the rear of the carriage 18 on opposite sides, there is provided a roller 129 journalled in a block 130 secured between the bar 126 and the angle member 108. On opposite sides of the front of the carriage there is provided a skid 131. The members 129 and 131 cooperate with the rail members 132—132 on opposite sides of the interior floor of the housing 10 to enable the carriage 18 to be moved relatively easily thereover but with sufficient friction to prevent undesirable slippage.

Stencil-Negative Master Carrier

Each stencil or negative carrying plate member 20, FIG. 4A, comprises a substantially rectangular structure including sides 134 and parallel top and bottom members 136 and 138, respectively, providing a central oblong opening. A stencil or negative 22 is adapted to span the opening and may be secured therein as by bolts 142, secured through members 134. The negative images may be formed as opacities on an otherwise transparent member or the negative may be typical photographic negative film or plates which can be suitably secured to the central portion of the carrier as by pressure sensitive adhesives, glue or tape. In the present embodiment the negative 22 comprises an opaque member forming the background surrounding a plurality of transparent image forming areas which are or may be photographically produced as by exposure and developing in a conventional manner.

The upper opposite edge portion of each side 13 of the members 20 is provided with a pair of horizontally disposed projections 144—144 defining a negative lifter notch 146 therebetween. Adjacent each of the projections 144—144 and located along the side 13 inwardly from the uppermost edge are orienting or cut notch 148. The notches 148 on one side only of each member 20—the left side as seen here—is provided with a V-shaped cut-out 152. In a manner to be explained later on, the square cut notch 148 on the right side is matingly engagable with a projecting member 157 depending from the one side of the rightward member 52″, FIG. 2, adjacent to one side wall of the housing 10. The oppositely disposed notch 148 with its V cut-out 152 is matingly engagable with a depending triangularly shaped member 153, FIG. 7, disposed on the right end of the leftward member 52″ adjacent the opposite side wall of the housing 10. Each negative carrying member is also provided with oppositely disposed stud-like projecting elements 154, which may be secured thereto as by bolts. The studs 154 on each negative carrier operate in conjunction with the parallel bar assembly 26, to move the light source 24 into a position to thereby illuminate the field of the negative and project the image thereof onto the photosensitized work piece 16, as will be described shortly.

The upper horizontal edge portion of each negative carrying member 20, FIG. 4A, is punched, drilled or otherwise provided with a series of openings 155 into which a stud or screw 156 may be threaded or otherwise demountably secured. Each stud 156 acts as an adjustably positionable exposure actuating element in a manner to be explained more fully later on.

Special Master

Also disposed in the negative carrying magazine 20, as one of the operating elements used therewith, is a special master member 158, which as seen in FIG. 4 comprises a rectangular, opaque structure of substantially the same general outline configuration and dimensions as the negative masters 20. The special master, as will presently be described, is utilized automatically to withdraw a work piece carrier 14 from the work piece magazine 12 and to move the same into the exposure area 28.

The special master 158, like each negative carrier, is provided with lifter notches 146 at opposite sides thereof and orienting notches 148, the notch on one side only (left in FIG. 4) being provided with a V-shaped cut-out 152 in the lower edge thereof. Additionally, the special master 158 includes oppositely disposed upstanding short bar-like lugs 160—160 which project slightly above the notches 148 to provide camming surfaces for engagement with the upper magazine transfer and clamping mechanism or actuating linkage 32, FIGS. 11 and 11A, at opposite sides of the housing 10, to permit the magazine 12 to be moved over the top of he housing 10, in a manner to be described later on.

Projecting vertically upwardly from opposite sides of the master 158, parallel to the inner edge of each square notch 150, is a hook or boot-shaped member 162, somewhat similar to the member 88, depending from each of the work piece carrying members 14, FIG. 5. The members 162 are attached as by bolts with the hooks turned inwardly so as to face each other. The members 162 are thus adapted to be brought into interfitting, interlocking or mating engagement with the outwardly turned elements 88 on the work piece carrying members 14, FIG. 7, for drawing the work piece 14 into the exposure area 28, as will be described shortly. The portion of the special master 158 adjacent the upper edge is drilled or otherwise perforated similarly to the negative carrying members 20, for demountably receiving exposure actuating studs 156 similar to those on the negative carriers. One of the studs 156 is effective, when brought into engagement with certain of the switches in the switch bank 40, on the upper central portion of the housing 10 to permit the operator to vary the exposure time, either shortening or lengthening it, to suit the convenience and purpose of the particular lenticular display which is to result from the operation of the present apparatus.

The Lamphouse

The source of illumination or lamphouse 24, in the present preferred embodiment, as shown in FIGS. 2 and 3, includes a rectangular or oblong box-like structure provided with a plurality of individual light-tight chambers 163, in each one of which is disposed a light bulb 164 which may be energized from a source of electrical energy, not shown, over conductive leads 165, FIG. 3, brought out to an electrical receptacle 166, on one side wall 48 of the housing 10. The number of light bulbs 164 in each chamber 163 will depend on the manner in which the final units are to be exposed as earlier described. Thus more than one light bulb may be employed as desired.

So that the light impinging upon the sensitized surface of each work piece 16 will fall in predetermined discrete areas with respect to each bit of information and so that the light from one information area will not mask, blanket or spill over into another adjacent or surrounding area of a neighboring work piece, the lamphouse 24 is provided with an aperture plate 167. Plate 167 is provided with a plurality of relatively small apertures 168 disposed thereon adjacent to a respective light bulb 164. A diffusing member 170 of glass, plastic or other suitable material, is located within each chamber 163 intermediate a respective light bulb and its associated aperture plate. The directivity of the light beam from each bulb is further restricted and channeled by means of a light guide member 172 including a plurality of rectangular tunnel-like chambers 174, FIGS. 3 and 7, disposed intermediate the light source or housing 24 and the exposure area 28.

The lamphouse 24 may be provided with one lamp 164 for each of the individual work pieces 16 which are to be successively exposed. Or, as many as twenty lamps may be employed for each work piece if required. However, if the particular work piece is relatively large, e.g., as large as four and one-half inches by nine inches in this embodiment, then only one lamp 164 would be required to illuminate the entire display area due to the relative sizes of the negative and work piece carrying member. Obviously, the guide 172 would not be necessary with the single lamp arrangemnet. In one reproducing type of display unit employing the present preferred embodiment of the invention, eight individual work pieces 16 may be disposed on the work piece carrier 14, which arrangement would require eight lamps 164 for proper exposure. However, as before stated, in the present embodiment only three work pieces 16 have been shown in order to avoid unnecessary confusion in the drawings.

In addition to the foregoing structural arrangement, three principal elements of the photo-optical system herein set forth, must be considered in providing means for automatically photo-printing the display units of the present invention. These comprise the emulsion surface of the display unit, the lenticular surface or lens of the display unit, and the lamp bulb which may be energized at any particular moment for the desired exposure of the discrete information area of the display. The lamphouse 24 and the orientation of the lamps therein must exactly duplicate the relationship which is to be found in the optical viewer with which the lenticular displays produced by the present apparatus are to be employed later on. In such a viewer, ten to twenty different bulbs may be employed for as many different message or data positions. This same structural configuration must be recreated in the present apparatus in order to provide for proper orientation of the lamps therein. The viewer, however, is essentially a fixed device. The lamp bulbs therein are fixed and the displays are effectively shifted relative to the viewer's eye by electrically energizing a selected bulb by means of a switch.

In the present apparatus, FIG. 7E, one lamp bulb is adapted to be moved with respect to a number of different relative information-data positions on each work piece 16 both vertically and horizontally. To this end, each lamp bulb 164 is fixed in the lamphouse 24 in a forward and rearward direction with respect to the negative and work piece corresponding to the focal distance in the viewer.

Message Display Unit

Figure 7A:
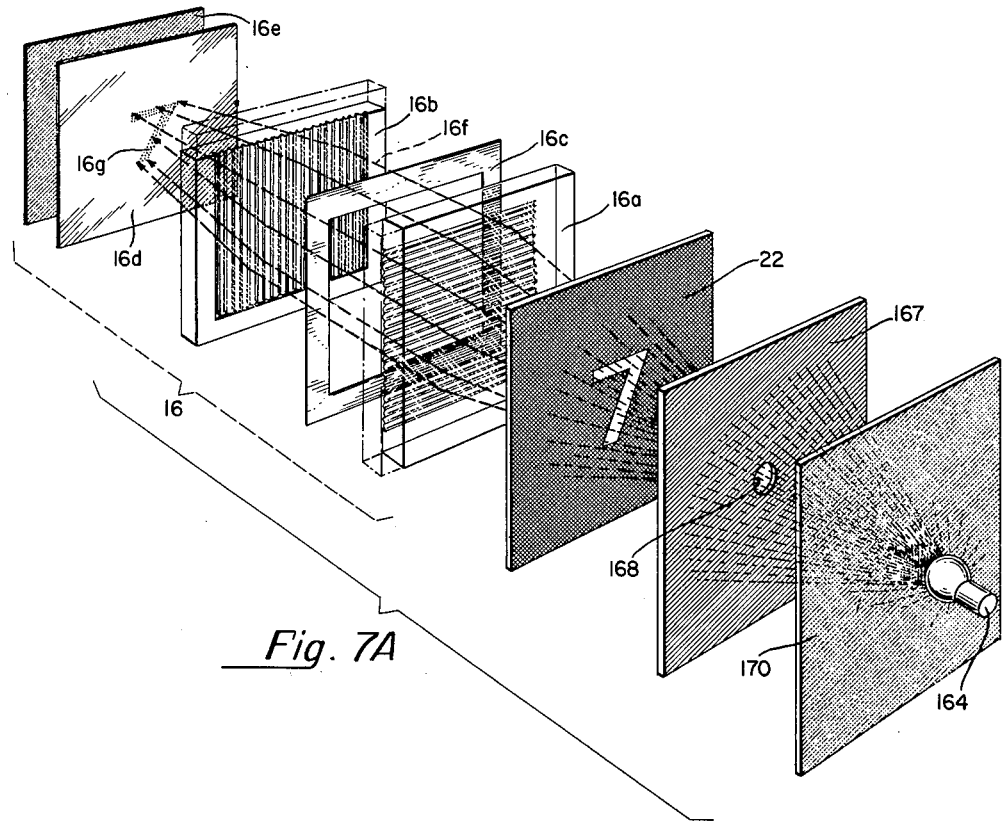
FIG. 7A is an exploded perspective diagrammatic view illustrating the formation of a desired latent optical image on a lenticular message display unit.
Figure 7B:
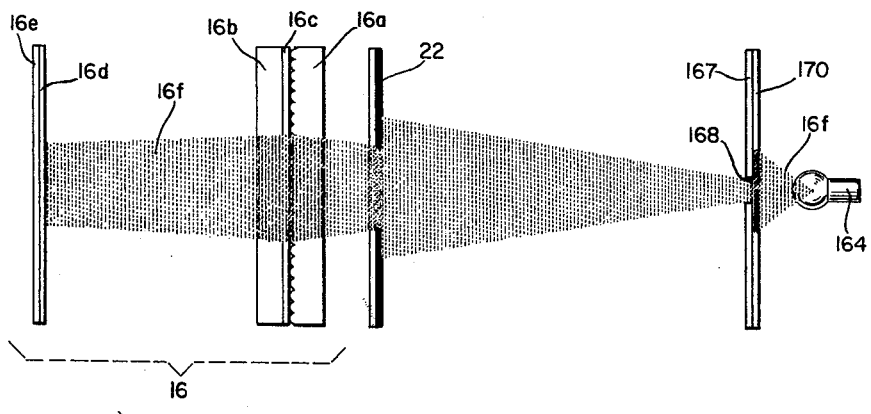
FIG. 7B is a partially exploded side elevational diagrammatic view of the apparatus of FIG. 7A.

As clearly seen in FIGS. 7A through 7D inclusive, the preferred embodiment of the optical information-data or message display unit, i.e., workpiece 16 comprises a laminated assembly including first and second lenticular lens members 16a and 16b which are bonded together in a known manner with their respective lens surfaces disposed in confronting relationship and at right angles to one another, FIGS. 7A and 7B. A gasket 16c of suitable material and forming a dust seal, among other things, is interposed between the members 16a and 16b prior to the bonding step. Suitable photosensitive emulsion, for example, stripping film 16d is applied to the flat rear surface of the outermost lens unit 16b by means of cement, etc. Thereafter a diffusing member 16e of vinyl or other suitable material is adhesively secured on the emulsion side of the film 16d.

In the partially exploded elevational view of FIG. 7B light from the bulb 164 is seen to be diffused by the member 170 after which the beam 16f is narrowed by means of the aperture plate 167 thereafter passing through the negative 22 to the first lenticular 16a. The light beam is once again narrowed by the second lenticular 16b emerging therefrom to impinge upon the emulsion 16d to form a latent image of the negative 22—a seven in this illustration.

Referring to FIG. 7E it is noted that the area encompassing the point or spot where the lenticular lenses cross one another is roughly equivalent to the area of a spherical lens. The lateral spacing of these equivalent spherical lenses, i.e., pitch of the lenticular lens, defines an equivalent area 16g on the surface of the photosensitive emulsion 16d within which all of the information data must be placed by suitable exposure. It follows then that each bit of information must be disposed in a square, each side of which is equivalent to the pitch of the lenticular lens itself. In the case of a 60 pitch lenticular, e.g., sixteen-thousandths of an inch, as many as eleven to twenty-two separate and discrete bits of information must be disposed within such a sixteen-thousandths inch square with little or no boundary effect.

By aiming the light beam 16f from a light source e.g., bulb 164, through a plurality of discrete points on the crossed lenticulars 16a and 16b, ten different positions of the light bulb 164 being shown in FIG. 7E, the different desired elemental areas 16g on the emulsion 16d, will be exposed to light. The result, after suitable developing and fixing, is a pattern 16h of opacities 16i substantially similar to the pattern of a half tone used in photoengraving.

In FIGS. 7C and 7D, wherein pairs of the elemental areas 16g of each pattern have been exploded out so as to more clearly depict the section of each wherein the opacity 16i may be located for the specific character being imaged by means of the light, two positions of the light bulb 164, relative to a negative, are shown, one for the number 7, and one for the number 0 respectively. It is to be understood that the two views are diagrammatic only and that the lenticular lens assembly after exposing, developing and fixing of the emulsion, will include all of the opacities in all of the areas which are necessary and required for the total number of bits of data, for example, the numbers from 0 through 9 which it is desired to include on the message unit. It is to be noted further in connection with the FIG. 7E that the pattern or path of the light bulb 164, as hereinafter described, need not be and in fact, is not circular. A circular configuration has been employed on the drawings simply as a convenience in illustrating the various positions which the light bulb might assume under various circumstances, as will be hereinafter described. The lamphousing 24 must be movable in space in two dimensions to exactly orient each negative image with its corresponding discrete, elemental information-data area on the emulsion surface of the display unit each time a fresh negative 22 is brought into operative relation with one of the work pieces 16 in the exposure area.

Parallel Bar Mechanism

In order to accomplish the proper exposure of each of the multiple discrete areas 169 on each of the lenticulated pieces 16, each piece is located on the piece plate 14 with extreme accuracy. Additionally, the lamphouse 24 is, as will now be described, movable in a fixed plane up and down and from side to side parallel to the exposure area 28. At the same time means is provided to adjust the fore and aft position of the housing 24 in order to accommodate other size display units. A parallel bar apparatus 26 provides a novel means for accomplishing this end, and comprises two substantially identical but oppositely disposed mechanical structures, FIGS. 1-3, 7, 8 and 8A, one on each side of the upper front portion of the housing 10. As clearly shown in FIG. 8A, each of the structures forming the parallel bar apparatus 26 includes a first relatively rigid elongated rod or bar 176 providing a main pivot for each side of the mechanism and being rotatably journalled in bearings 178 disposed at opposite ends thereof in frame members 180 attached to side walls 48 of the housing 10. Each bar 176 carries inner and outer radius arms 182 and 184 disposed at opposite ends thereof and secured at one end to the first bar as by set screws (not shown) in a known manner. The other end of each radius arm extends laterally away from the bar 176 toward the interior of the housing 10 and terminates as a C-shaped clamp 186. Each C-clamp 186 includes a bearing member 188 into which a second rigid bar 190 is pivotally mounted parallel to the first bar 176. The two radius arms 182 and 184 thus are torsionally aligned with each other.

The second parallel bar 190 has attached to it, as by set screws, two relatively short stub arms 192, which depend substantially vertically therefrom and terminate as C-shaped clamps 194 also forming a torsionally rigid assembly. Bearings 196 suitably secured in each clamp 194 pivotally support a third bar 198 which is constrained to move parallel with the first and second bars 176-190. The entire parallel bar assembly is under the influence of gravity and at its lowermost level rests on a transverse beam 200 extending horizontally across the front of the housing 10. Oppositely disposed rollers 202, FIG. 8, each one of which journalled to a respective stub arm 192 at a point above and slightly to one side of an imaginary reference line extending between the center of the ends of the second and third bars, are adapted to rotate in surface contact along the bar 200. A substantially wedge-shaped member 204 secured to each roller shaft 206 constrains the rollers in a fore and aft direction preventing accidental dislodgement thereof while enabling substantially linear traverse of the rollers across the member 200. Adjustable lateral limit members 203 terminate the right and left excursions of the bar mechanism. To limit the vertical movement of the bar mechanism, oppositely disposed stops 207 are adjustably attached as by bolts to the walls of the front of the housing. This structural arrangement permits a straight line horizontal movement of the parallel bar mechanism on the straight surface provided by transverse bar thereby practically eliminating any pendulum effect.

In addition, the foregoing arrangement is free of axial play and thus prevents any disturbance of the so-called focal length of the apparatus. This result is accomplished by preloading each of the bearings in each of the clamps at the time the radius arms are clamped thereraround. The entire mechanism is thus sufficiently rigid so that any movement of the inner or rear end of the mechanism will permit the whole parallel bar apparatus to be similarly moved in space. Thus the front and rear portions of the mechanism tend to be synchronized by virtue of the torsional rigidity of the interconnected parallel bars. It is apparent therefore, that if the rear (inner) end of each of the third bars 198 is raised, the front end of these bars also will rise. As will be discussed hereinafter, parallel motion of the system is originated at the rear ends of the third bars 198.

As is seen in FIGS. 1, 2 and 3, the lamphouse 24 may be rigidly but adjustably, slidably mounted intermediate the ends of the lowermost parallel bars 198 and transversely of the housing 10, by means of a transverse bar 208 secured to the base of the lamphouse in a known manner and attached at its opposite ends to bars 198 as by set screws or other similar means. The rear or inner end of each one of the lowermost parallel bars 198 is provided with an L-shaped cam member 210, shown most clearly in FIGS. 7 and 8A, secured to a rigid spacer block 212 fixed on the rear end of each bar in a suitable manner and movable therewith. The longer arm 213 of the L-shaped member 210 is angled in a direction toward the side wall of the assembly 10 while the shorter arm 213a of the L-shaped cam is oppositely angled toward the interior of the housing 10. As each negative bearing member 20 is moved upwardly out of the negative magazine 18, in a manner to be explained later on, the oppositely disposed pins 156 thereon slide into contact with the L-shaped cam members 210. Upward movement of the negative bearing member 20 will cause the pins 154 to move against the sides 213 or 213a of the arms of the cams moving the parallel bar mechanism 26 carrying with it the lamp bank 24. Continued upward movement of the member 20 simultaneously enables the cam 153 on one side of the housing 10 to be received within the V notch 152 of the carrier 20 while the cam 157 on the opposite side of the housing is received within the square notch 148 of the carrier 20. At the point in the upward travel of member 20 where the cams 153 and 157 bottom in their respective notches 152 and 148 respectively the vertical and horizontal orientation of the lamphouse is terminated thereby accurately positioning the latter with respect to the negative.

So that the combined mass of the lamp bank 24 and the parallel bar mechanism 26 will not load down or stall the operation of the lifter mechanism 34, to be described hereinafter, a set of substantially identical pulleys 209 and cords or cables of nylon or other similar material interconnect opposite sides of the parallel bar mechanism 26, FIG. 8, to a simple counterweight 211, FIGS. 1, 2 and 5. The two cords from opposite sides of the parallel bar mechanism are tied together, as seen in FIG. 2, so as to synchronize the movement of the two sides of the apparatus. This latter arrangement provides almost frictionless motion and permits the adjustment of the system for any size and weight lamp assemblies.

Contact Printing Frame

The present apparatus provides a contact printing type of photographic exposure, i.e., the elements bearing the photographic emulsion and those bearing the negative or stencil are adapted to be brought into contact engagement with one another. Since each work piece 16 is adapted to be exposed by N number of negatives, the work pieces must be positioned within and remain fixed relative to the exposure area 28. Each negative carrying member 20 is then moved into register with the work piece carrier and the assembly exposed to light. Thereafter a new negative is substituted for the previous one, and so on, in automatic time-controlled sequence, as mentioned earlier herein, until the whole operation is completed.

It is apparent from the foregoing that each work piece carrying member 14, whether carrying a single work piece or a plurality of work pieces, must be positioned in the exposure area 28 until all of the negatives 22 required for each message, e.g., ten to twenty, have been exposed. The means providing this function is shown in FIGS. 1–3, 5 and 9A, and is seen to include a relatively rigid rectangular planar member 214, FIG. 5, disposed in the upper central portion of the housing 10 adjacent the exposure area 28, FIGS. 1–3, and extending transversely thereacross. A parallel pair of narrow elongated spaced apart members 216, the upper extremities 218 of which are bent apart, as indicated in FIG. 9A, are secured to the opposite vertical edges of the front side of the planar member 214 thus providing receiving grooves adapted to support a work piece carrying member 14 within the exposure area 28. Attached to the rear side of the planar member 214, is a switch 220, FIGS. 3 and 5, the actuating element 222 of which extends angularly downwardly across and into the area spanned by a work piece carrying member 14, when the latter is received between the parallel elements 216 of the planar member. Closure of the switch 220 by engagement of a work piece with actuator 222 produces an electrical signal indicating that a work piece carrier is in the exposure area 28. This signal is utilized, in a manner to be explained later on, in connection with the description of the electrical circuit diagram of FIG. 13 for the present invention.

The lower edge portion of the planar member 214, FIG. 5, is provided with orienting means for engagement with each work piece carrier including a left L-shaped orienting member 224 attached to a vertical supporting element 226 secured as by bolts to the planar member 214 so that the shorter upwardly extending pointed leg 228 of which is enabled to matingly engage a notch 230 located on the bottom edge of each work piece carrying member. A right orienting member 231 similarly attached to a vertical support 226, is provided with a flat ledge portion 232 engageable with the flat lower edge of the opposite side of each work piece carrying member 14. In combination, these two members exactly and accurately locate each work piece carrier 14 with respect to the exposure area 28 and the lamphouse 24. Attached as by bolts 227 to the transverse cross member 52 which is disposed parallel to the member 214, are two back stop members 233 forming bumpers for the planar member 214. Each member 233 may be provided with a thin layer of cushioning material such as plastic foam, felt, etc. (not shown).

As seen in FIG. 5, the planar member 214 is pivotally mounted for swinging movement on oppositely disposed movable pivots 234 extending from the lower depending ends of the longer arms 236 of bell cranks 238. The pivots 234 may be press-fitted into the side edges of the planar member 214 slightly above the transverse center line thereof, FIG. 9A. The shorter arms 239 of each bell crank 238 extend horizontally rearwardly away from the arms 236 (FIG. 1) and each carries a laterally extending stud or pin 240, FIG. 10, projecting therefrom. Bell cranks 238 are pivotally mounted at the upper end of the longer arms 236 by means of fixed pivot pins 241 (FIG. 9A) which project away from mounting blocks 242 (FIG. 5) the latter being attached, as by bolts adjacent to the ends of transverse frame member 52 of the housing 10. The planar member 214 thus is permitted to have a relatively straight-line motion in a forward and rearward direction so that it can carry a work piece forwardly into physical contact with a negative carrying member, as will be described shortly. So that it may be quickly withdrawn from the exposure area 28 after each negative has been exposed, the planar member 214 is biased in a rearward direction by means of a spring 243, FIGS. 1–3, one end of which is attached to the member 214 adjacent switch 220, FIG. 2. The opposite end of the spring 243 is secured to a supporting bracket 244 depending from the transverse beam 44 at the rear of the machine.

*Work Piece Magazine Transfer and Clamping Mechanism*

For effecting the forward and rearward movement of the planar member 214, the upper linkage 32 is provided and is located in the upper central portion of the housing 10, as shown in FIG. 1. This apparatus generally includes a pair of oppositely disposed radius arms 245, FIG. 2, one on each side of the housing 10, which are adapted to be moved forwardly and rearwardly of the housing in a manner and by means to be described subsequently.

Figure 3B:
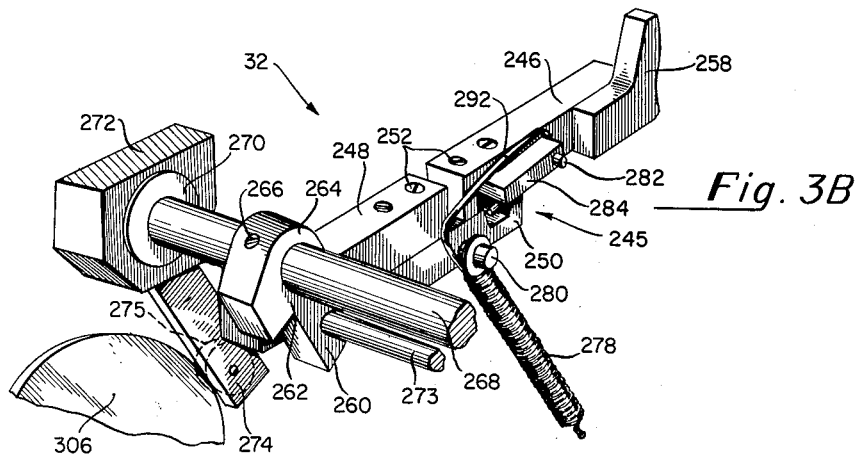
FIG. 3B is an isometric view of the work piece carrier transport mechanism illustrated in conjunction with its operation.

As seen in FIGS. 1, 2, 3 and 3B, each radius arm 245 includes a forward and a rearward member 246 and 248 respectively, spanned by an intermediate member 250 adjoining the other two together, as by bolts 252, FIG. 3B, thus providing ease of adjustment, maintenance and repair. Obviously, each radius arm including its pawl (identified below) could be fashioned as an integral assembly if such construction were described. The rearward portion of the member 246 and the forward portion of the intermediate member 250 are provided with notches 254 and 256 (FIG. 1) together forming an opening for purposes to be described shortly. Disposed on the forward end of member 246 is an upstanding work piece magazine actuating or driving pawl 158 providing means for moving the work piece carrying magazine 12 along the rails 104 on the top of the housing 10, FIGS. 11 and 11A.

The rearward end of each radius arm 245 is pivotally mounted to one end 260 of a swing block 262. The other end 264 of the block is secured, as by set screws 266, to a transverse bail 268 extending across the housing and journalled in bushings 270, FIG. 3B, disposed in blocks 272 attached to the top of the housing 10. In order to synchronize the forward and rearward excursions of the radius arms 245, a bail 273 projects through the ends 260 of both blocks 262 and interconnects the two radius arms in the manner shown in FIGS. 2 and 3B. A depending follower arm 274 is secured at its upper end to opposite ends of the bail 268. The lower end of the arm 274 carries a cam follower roller 275 drivingly engageable with the periphery of main drive cam 306, as will be discussed hereinafter. A coiled spring 276, FIG. 1, attached at its rearward end to the transverse cross frame member 44 and at its forward end to the swing blocks 262, biases the radius arms in a rearward direction. Each radius arm 245 is also biased in a vertical, downward direction, FIGS. 1, 2, 3 and 5, by means of coil springs 278, each having one end attached to a stud 280 on the intermediate radius arm member 250 and their opposite ends attached to pins 281 projecting from respective back up support members 233, FIGS. 3 and 5, against which the planar member 214 is adapted to rest in its rearmost or rest position. The planar pressure board 214 must be advanced to the back of the negative master with a smooth, vibrationless, firm pressure, since any movement during exposure would produce a blurred photographic image. Once the exposure is completed, however, and to increase the speed of operation of the apparatus, board 214, is permitted a "snap back" action from the point of contact with the negative carrying member to the original position of the board against its stop members 233. This action is accomplished by a spring loaded cam mechanism, as will now be described.

To each of the forward portions 246 of the horizontally extending radius arms 245 there is pivotally mounted, by means of a pin 282, FIG. 10, a short bar-like member 284, the unattached end of which has a pin 286 projecting from one side thereof carrying an elliptical cam 288. The pin 286 extends into and through the opening formed by the confronting notches 254 and 256 of the members 246 and 250 of the radius arms, to position cam 288 between the radius arm and shorter horizontal arm 239 of the bell crank 238 in interfering relation with a laterally extending stud 240 on the arm 239, see FIGS. 2 and 10. A spring 292, FIGS. 9 and 10, biases the cam carrying member in an upward direction such that the pin limits against the roof of the notch 254. Thus the cam 288 is permitted only a vertical downward movement against the tension of the spring 292.

In a manner to be described later on, when the radius arms 245 are moved forwardly of the machine through the openings 54 in the transverse supporting members 52, so as to ride over the camming blocks 52a, FIGS. 9–9C, the elliptical cam 288 rides up over the pin 240 projecting from the rearwardly extending arm of the bell crank 238 depressing the pin and pivoting the bell crank about its fixed pivot 241, FIG. 9A, causing the plate member 214 to move forwardly in a substantially straight line, arrows 290 at the top of these figures, pushing the plate 214 and a work piece carrier 14, if any, into engagement with the negative carrying member if one is positioned in the exposure area 28 (FIGS. 9 through 9C), at which point photographic contact printing registration is complete and an exposure may take place.

As the radius arms continue their forward motion in the direction of the arrows 290, FIGS. 9 and 9A, the lower surface of each elliptical cam 288 reaches a point, just beyond that shown in FIG. 9A, where the cam slips off and thus releases the pin 240 permitting the planar member 214 to be snapped rearwardly by the spring 243 causing the pin to reach the position shown in FIG. 9B, slightly above a line extending horizontally through the center of the cam. At this point in the cycle of operation, the radius arms begin their movement toward the rear of the machine. The elliptical cam 288 now rides under the pin 240 and, since as before noted, it is not permitted any upward movement, the cam is depressed arcuately downwardly, FIG. 9C, against the tension of the spring 292 until it reaches a point in its rearward movement where the spring will snap it out from under the pin 240 returning it to its original rest or starting position (FIG. 9). In this fashion, a vertical force acting on each horizontally projecting radius arm moves the piece plate 214 in a fore and aft direction.

Drive Means

Referring now to FIGS. 1 to 3 inclusive, and particularly to FIG. 2, a source of driving torque for the present apparatus is seen to comprise an electrical motor 294 disposed in the upper left rear portion of the housing 10, and suitably mounted on a bracket 244 depending from the cross member 44. The motor is coupled to a drive pinion 296 through a suitably supported short drive shaft 297 disposed between the motor and the drive pinion.

Main Cam Shaft

Figure 3A:
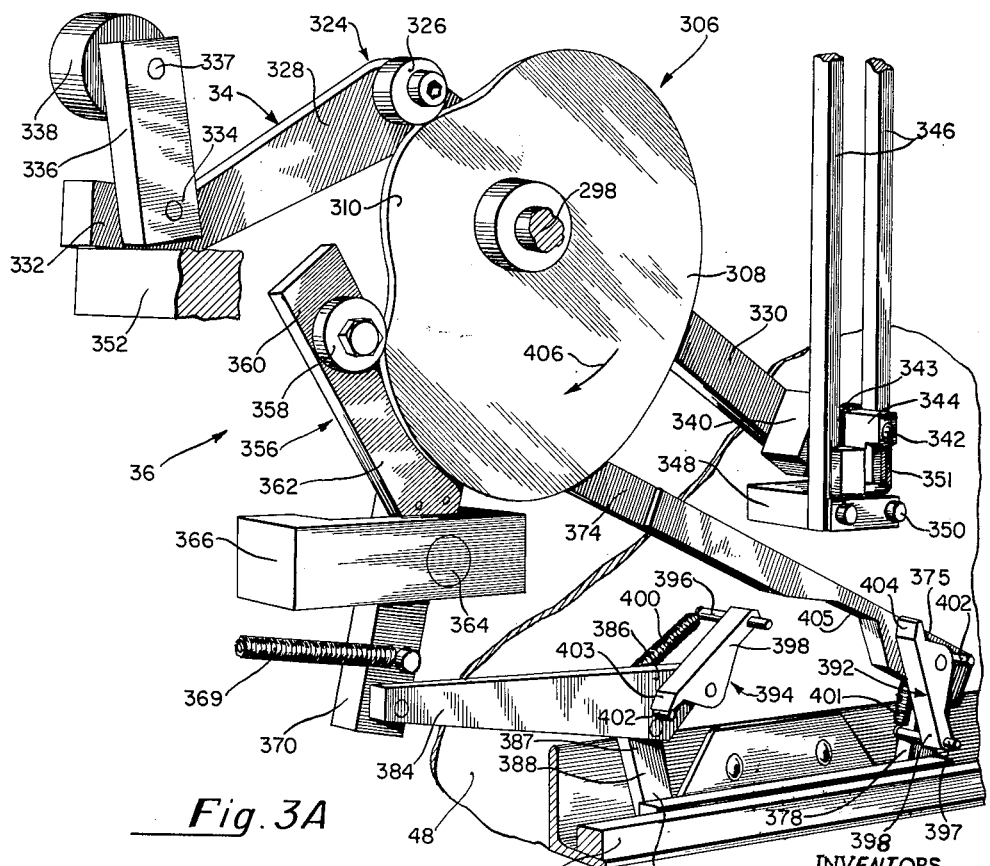
FIG. 3A is an isometric view of the main drive of the apparatus including the operating linkages for moving a negative carrier forwardly and rearwardly of the machine and the elevating mechanism used therewith.

A central or main cam drive shaft 298 extends transversely across the upper rear portion of the housing 10, and is journalled at its opposite ends in bearings, not shown, in blocks 320 secured to the side walls 48 of the housing, as shown most clearly in FIG. 2. The cam shaft 298 is coupled to the pinion 296 through a large gear 304 attached as by a set screw on a hub thereof. In this preferred embodiment of the present invention, and as hereinafter disclosed, the main driving mechanism 30 is as are each of the operating linkages 32, 34 and 36 of the machine divided into two independent, oppositely disposed but conjointly operable mechanisms, located on opposite sides of the housing 10. As shown in FIG. 3A, each main driving mechanism includes the large multi-lobed cam 306, earlier referred to herein, which is fixedly mounted to and rotatable with the cam shaft 298. Each main driving cam 306 is provided with a major actuating lobe 308 extending through approximately 300 degrees of its circumference and a minor actuating lobe 310 which includes most of the circumference of the cam.

Interval Timing Cams and Switches

Disposed along cam shaft 298 at varying intervals in spaced apart side by side relation are located four adjustable two piece cams 312a, 312b, 312c and 312d, each one of which may have its major and minor lobes displaced relative to each other by means of an adjusting slot 314 in the minor lobe and a bolt 316 projecting therethrough. Adjacent to and behind the periphery of each cam is a microswitch 318a, 318b, 318c and 318d supported on members 244, FIG. 3, depending from the cross member 44. The bifurcated actuating arm 320 of each switch carries a roller 322 at the end thereof which is biased into engagement with the periphery of its respective cam. The operation of each of the microswitches and their interconnection with other operating switches, etc., of the apparatus will be explained later on.

The four microswitches 318a, 318b, 318c and 318d provide means for timing the exposure of each work piece 16 and permit the operator to preselect the interval during which the lamp or lamps 166, in the lamphouse 24 expose a particular negative. The operator is thus given control over the final exposure. In cases where there may be differences, i.e., variation in density, etc., between various negatives, the microswitches provide a convenient and available means for correcting such differences as by varying the exposure relative thereto. Such exposure time is determined by adjusting the individual cam to increase or decrease the exposure time in cooperation with the switches 40 which are selectively actuatable by means of the screws 156 on each negative carrier, as before mentioned.

Work Piece Retracting and Negative Lifting Mechanism

The middle linkage 34 functions in a dual capacity to elevate the special master 153 from the negative magazine 18, as will be described, to withdraw a work piece carrier 14 from the work piece magazine into the exposure area 28 and in addition to elevate a negative carrier 20 from the negative magazine 18 and position it briefly in the exposure area 28 adjacent the work piece carrier 14 during the timed exposure.

This mechanism includes oppositely disposed substantially L-shaped compound lever members 324, FIGS. 1–3, and 3A, each carrying a cam follower roller 326, journalled at the juncture of its two arms 328–330, and engaging the periphery of the cam 306. An offset rearwardly projecting portion 332 of arm 328 is rockably pivoted to the depending end 334 of a short link 336. The other end of the link 336 is secured to a shaft 337 journalled in a bearing member 338 resiliently supported in a mounting block 339, FIGS. 1 and 3, bolted to the upper rear side wall portion of the housing 10. The forward end of the arm 330 is secured to a spacer member 340 which is provided with a shaft 342 projecting laterally away therefrom and carrying a roller 343. An inverted L-shaped lifter cam 344 is mounted on the end of shaft 342 with its longer leg projecting laterally therefrom toward the interior of the housing. Each roller 343 is slidably guided between two parallel upstanding spaced apart guide rails 346 secured to stand off blocks 348 attached as by bolts 350 to the side walls 48 of the housing 10. A substantially U-shaped block 351 disposed adjacent the lower ends of the guides with its parallel arm portions adjacent and parallel to the guides 346, provides a lower terminal stop for the lifter cam 344. In order to prevent the mechanisms on opposite sides of the machine from getting out of synchronism, a transverse bar 352 is attached in a suitable manner to the off-set rearwardly projecting end portion 332 of each L-shaped lever 324, and joins the two linkages together thus rigidifying both assemblies. This construction also tends to prevent the cam follower roller 326 from misaligning itself with the main cam or from becoming accidentally dislodged from the cam lobe altogether thus, in effect, reducing the possibility of jams. It should be clear from what has gone before that rotation of the main cam shaft 298 by means of the drive motor 294, FIG. 2, causes cams 306 alternately to raise and lower the L-shaped levers 324 with respect to the floor of the housing 10. The lifter cam 344 being constrained between the two parallel guides, will be forced to rise and fall as the main cam 306 is rotated, for a purpose to be described shortly.

Negative Magazine Carriage Transfer and Drive Mechanism

As seen in the lower left portion of FIGS. 1 and 3, and in FIG. 3A, the lower linkage 36 provided for rectilinearly moving the negative magazine 18 within the housing includes a substantially Y-shaped lever 356 carrying a follower 358 at the end 360 of the leftwardly extending arm 362 thereof. Lever 356 is pivotally mounted on a stud 364 supported in a U-shaped bracket 366 attached to the wall of the housing 10 as by bolts 368, FIG. 1. Lever 356 is biased in a clockwise direction by a coil spring 369 one end of which it attached to the lower portion of the main leg 370 of lever 356 the other end of which is attached to the rear vertical frame member 46.

The upper end of the main leg 370 is pivotally secured at 372 (FIG. 1) to an elongated drive arm or link 374, the rightwardly extending end 375 of which is pivotally secured to one end 376 of a short stub link 378. The other end 380 of link 378 is rockably mounted to the lower inner longitudinal frame member of the base of the housing 10.

Pivoted to the lower end of the leg 370 is a relatively short wedge shaped arm or link 384, the rightward extending end 386 of which is rockably pivoted to one end 387 of a short stub link 388 similar to link 378. The other end 390 of link 388 being rockably pivoted to the lower longitudinal frame member of the housing.

Irregularly shaped substantially identical, forward and rearward negative magazine driving dogs or pawls 392 and 394 engageable with the castellations on opposite sides of the negative magazines are pivotally mounted to the respective ends 375 and 386 of the links 374 and 384. The pawls are provided with cam follower pins 396 and 397 extending laterally from opposite sides of one end 398 thereof for engagement with the cams of the negative magazine 18, as will be described hereinafter. Biasing springs 400 and 401 for the pawls are attached at one end to a respective link 374 and 384 and at the other end to its associated pin 396 and 397. Each link 374 and 384 is provided with a limit pin 402 forming a terminal abutment for the tail 403 and 404 of a respective pawl when one of them is in a retracted non-operating position as shown in FIG. 3A. It should be clear from the foregoing that rotation of the main cam will cause the Y-shaped arms 356 to rock about their pivotal axes 364 reciprocating the links 374 and 384, causing the driving pawls 392 and 394 to move toward and away from each other during each cycle of operation. Clearance notch 405 prevents interference between the rear pawl 394 and the longer link 374 when the two pawls reach positions where they are closest together during the operating cycle.

Operational Description

A typical operating cycle of the preferred embodiment of the present invention will now be described. Referring first to FIG. 3A, it is assumed at the outset that the operating elements of each of the upper, middle, and lower drive linkages 32, 34 and 36, respectively, including the various drive pawls, lifting cams, etc., are in the relative positions shown therein. It is assumed further that the negative carrier magazine 18, FIGS. 4 and 4A, has been loaded with a special master 158 and a plurality of stencil or negative masters 20 and that the carriage 18 has been inserted into the front portion of the housing 10. The carriage is then pushed well back into the housing until the camming pins 396 on the nose of the rearward oppositely disposed driving pawls 394, are engaged by the curved camming surfaces 121 of the longer cams 120 on the carriage 18, camming the pawls 394 downwardly into positions such that their respective springs 400 snap them by over center spring action into one of the notches 127 in the castellated members 126 paralleling the negative carriage thus terminating the manual inward movement of the carriage.

During this initial inward movement each of the front pawls ratchet idly over the castellations until its respective cam follower pin 397 engages the surface 123 of the smaller cam 122 which cams the pawl upwardly into a position such that its spring 401 can snap it up out of the path of movement and clear of the castellations. The carriage 18 is now ready for automatic rectilinear movement relative to the housing 10. Although it is not a concomitant of the operation of the present apparatus as should be apparent from what has been described hereinabove, it may in some instances be desirable to initially withdraw the negative carrier magazine rightwardly, FIGS. 1–3, so as to place the special master in such a position as to be first elevated toward the work piece magazine thereby to initiate the photoprinting operation. In other instances it may be desirable to cycle the machine to automatically position the special master in operative relationship to the work piece magazine.

Assume for the moment that a work piece carrier 14 including one or more photo-sensitized work pieces 16 is presently disposed in the exposure area 28, FIG. 3, having been previously automatically extracted from the magazine 18. If the "on-off" switch 412 (FIG. 1) is snapped to its "on" position to energize the drive motor 294 over the electrical circuit of FIG. 13, as will be described shortly herein, the main cam shaft 298 carrying the cams 306 and the interval timing cams 38 will be rotated in a clockwise direction as indicated by the arrow 406, FIGS. 1 and 3.

Figure 12:
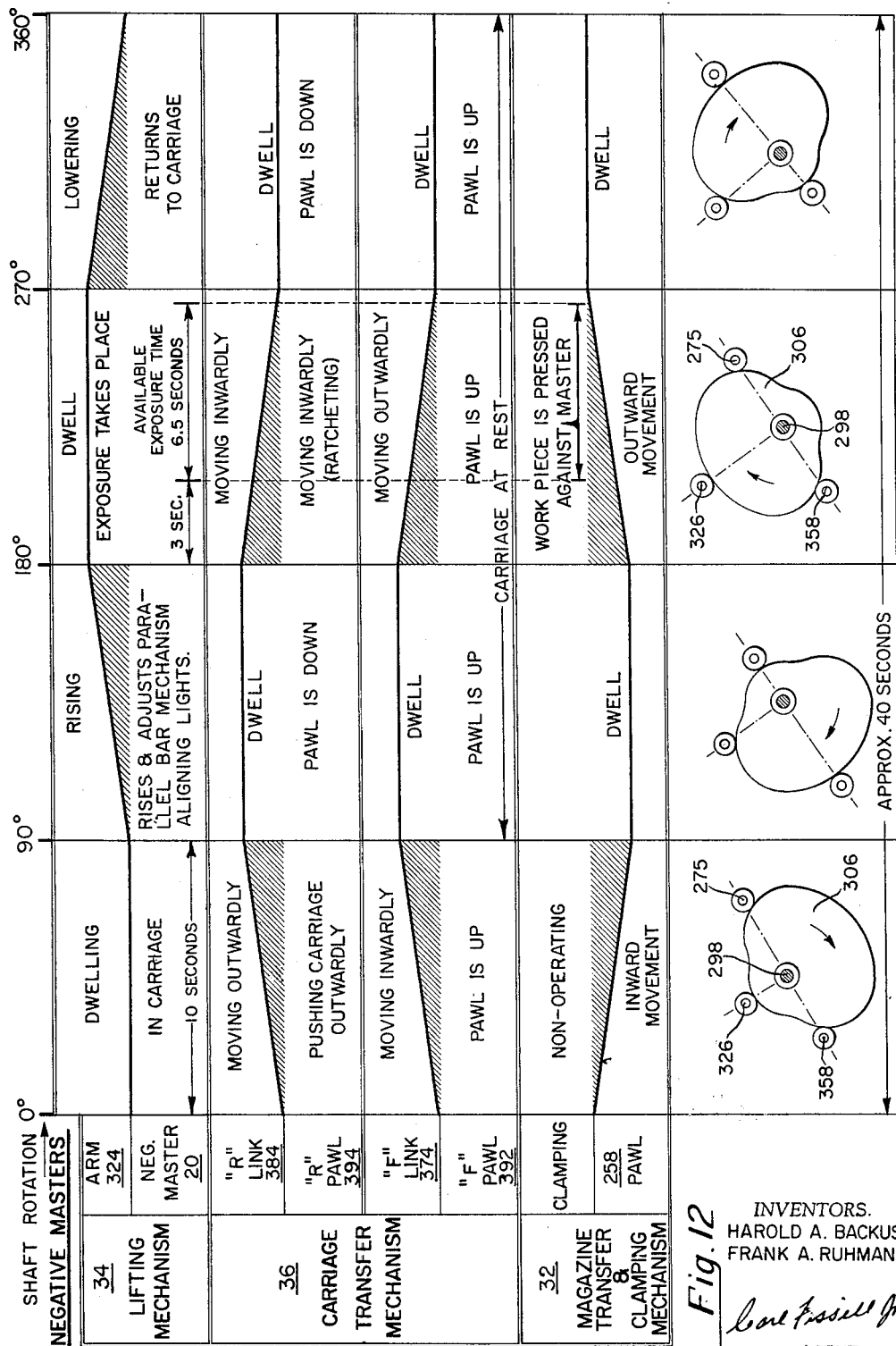
FIGS. 12 and 12A are timing diagrams respectively for the negative master and special master and illustrate the motion of the various pawls which are used in driving the negative carrier forwardly and rearwardly of the apparatus during its operation.
Figure 12A:
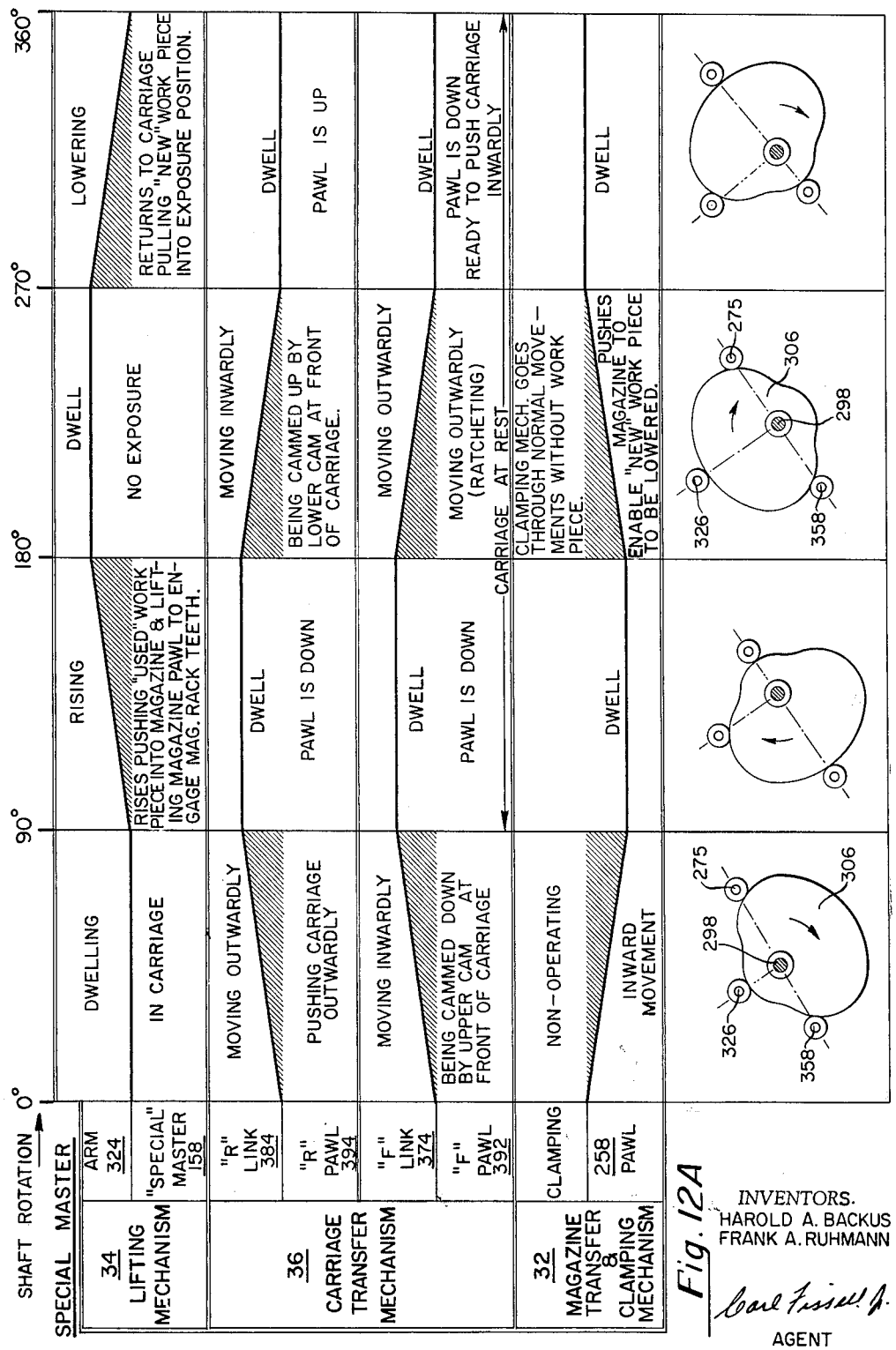

As can be seen by referring to the timing diagrams of FIGS. 12 and 12A, and first with respect to FIG. 12 thereof, from 0° to 90° of rotation of shaft 298, the lifting mechanism 34 is dwelling, as is the clamping mechanism of the upper linkage 32. The Y-shaped levers 356 are now rocked counterclockwise causing the front and rear negative carriage driving pawls 392 and 394 to move toward each other. The negative carriage 18 has capacity for 20 negative carriers. However, only half this number of carriers 20 is illustrated in the drawings. As seen in FIG. 6D, the front pawl 392 is clear of the castellations and is dwelling while the rear pawl 394 is disposed adjacent a notch so that continued movement thereof will cause pawl 394 to push the carriage 18 rightwardly (outwardly) moving the latter into a position to present the first negative carrier of the series to the oppositely disposed lifter arms 344 of the lifting mechanism 34. The spacing of the notches and projections on the castellated bar 126 is such that incremental step-by-step driving movement thereof will present alternate negative carriers 20, i.e., every other carrier in the group, to the lifting mechanism. The forward movement of the negative carriage causes the projections 144—144 on opposite sides of the first negative carrier 20 to straddle the lifter cams 344 on opposite sides of the machine, FIG. 7.

At approximately 90° of rotation of cams 306 the lifter cams 344, now disposed in interlocking or interfitting engagement with the notches 146 on the negative carrier 20, begin to rise vertically and continue their upward travel to 180° of rotation of cams 306. The camming studs 154 engage the arms 213 or 213a (FIG. 7) on the parallel bar mechanism 26 thereby lifting the lamphouse 24 into one of its preselected positions adjacent to the exposure area 28. At this time orienting notch 152 on one side of the negative carrier 20 is engaged by the depending member 153 on the member 52' of the housing 10 while the opposite square lug 157 is simultaneously received within the square notch 148 on the opposite side of the carrier 20 to accurately locate the negative carrier 20 relative to the work piece carrier 14 and the lamphouse 24. At 180° the pin or stud 156 on the negative carrier 20 closes one of the switches in the switch bank 40, which in conjunction with the interval timing cams 38, as will be described later on in connection with FIG. 13, to energize the lamps 166 in the lamphouse 24.

The lifting mechanism 34 now dwells from 180° to 270°. The magazine transfer and clamping mechanism 32 moves forward to press the work piece carrier 14 against the negative carrier 20 in contact printing relation, whereupon the lamps 166 are energized to expose the work pieces 16 to light from a discrete preselected angle, in connection with FIGS. 7A–7E, as herein earlier described. The work piece carrier is thereafter snapped back to its original non-operating position while the transfer and clamping mechanism moves leftwardly away from the exposure area 28, the lower mechanism 36 simultaneously separating the driving pawls 392 and 394.

From 270° to 360° of rotation of shaft 298 the lifter mechanism 34 lowers the lifter arms carrying the negative carrier 20 and reinserting the latter within the magazine 18. The carriage transfer mechanism 36 is dwelling as is the work piece magazine transfer and clamping mechanism 32. It is noted that the negative carriage 20 is shiftable in two directions i.e., rightwardly and leftwardly within the housing, in discrete, smoothly integrated steps. This movement which is constituted by the notches and projections on the castellated bar in combination with the driving pawls 392 and 394 causes the carriage to move two spaces at a time. This action brings every alternate negative carrier into position to be engaged by the lifter arms and be lifted into the exposure area thereby. Thus in the rightward or outward direction of movement the carriage will position, counting from the left, FIGS. 1 and 2, the first, third, fifth, seventh, and ninth negative carriers to the lifter arms for movement thereby into the exposure area. On its return, inward or leftward direction of movement the carriage will present the eighth, sixth, fourth, second, zero and master carriers—those negative carriers which were entirely skipped over—to the lifter arms for positioning into the exposure area. The cycle just described is thereafter repeated for each negative in the negative magazine or until the desired message format has been completely exposed.

Approximately at the end of its travel in a rightward (outward) direction and during movement of the links 374 and 384, dotted arrows 408 and 410, toward each other, FIG. 6, the camming pin 397 on the front pawl 392 will engage and ride down the curved surface 119 of the cam 118 on the negative carrier magazine 18 permitting the springs 401 to snap the respective pawls into engagement with opposite projections 128. Continued rotation movement of the main lobe of cams 306 will cause the two links 374 and 384 effectively to separate and move apart, FIG. 6A. This separating action carries the rear pawl 394 leftwardly to bring its camming pin 396 into engagement with the arcuately shaped cam 116 forcing the pin upwardly along the surface 117 moving the pawl 394 upwardly to a position such that the spring 400 will snap the pawl 394 from the dotted line position to the full line position clear of the castellations and carriage cams, FIG. 6A, while the forward end of the link 384 passes through the arc shown by the broken arrow 408. Simultaneously, with this operation, the front pawl 392 is moved from the full line position of FIG. 6 to the position shown in FIG. 6A. Continued rotation of the main cams 306 brings the two links toward each other again so that the nose 398 of the front pawl 392 clicks into the notch behind the first projection whereupon further motion of the link in a leftward direction causes the pawl to drive the carriage 18 inwardly (leftwardly). Thereafter the incremental inward movement of the carriage is accomplished in the same manner as that described for the outward movement and no further description of this action will be made.

As the carriage reaches its terminal position interiorly of the housing 10 and during the confronting movement of links 374 and 384 dotted lines 408 and 410, projecting pin 396 on rear pawl 394 rides over the radial surface 121 of the cam 120 until the spring 400, which is set below the pivot point of the pawl, snaps the pawl downwardly to engage a projection 128, as shown. Further movement of the linkage 36 separates the links 374 and 384 causing the front pawl 392 to ratchet over the castellations and bring the pin 397 into engagement with the radial surface 123 of the small cam 122 camming the pawl upwardly about its pivot point in an arc as shown by the dotted arrow of FIG. 6D, until it reaches a point where the spring 401 snaps it clear of the cam surface. Continued movement of the linkage 36 moves the rear pawl 394 into engagement with an adjacent projection 128 thereby moving the carriage in the manner earlier described. In this manner the carriage 18 is incrementally advanced inwardly of the machine, two steps at a time, as desired.

The special master 158 is adapted to be moved relative to the negative carriage magazine 18 in precisely the same manner as heretofore described with respect to the negative carrier 20. However, the special master is the means by which the work piece carrier magazine 12 is incrementally rectilinearly advanced over the housing 10 and it also is the means by which a work piece carrier 14 is extracted from the magazine 12, lowered into the contact printing frame and thereafter returned to the magazine 12.

Referring to FIGS. 7 and 12A, it is seen that from 0° to 90° of rotation of cam shaft 298, the rear drive pawls 394 of the carriage transfer mechanism move the negative magazine 18 rightwardly locating the oppositely disposed pairs of projections 144—144 of the special master 158 in a position such that each pair of projections straddles its respective lifter arm 344 and the hook-shaped members 162—162 engage the depending boots 88—88 of the work piece carrier 14 now within the exposure area 28. The clamping elements of the transfer and clamping mechanism 32 are dwelling during this time while the radius arms 245, i.e., drive pawls are moving leftwardly of the housing 10.

From 90° to 180° the lifting mechanism 34 causes the special master 158 to push the previously exposed work piece carrier 14 upwardly, FIG. 7, into the magazine 12 while the carriage transfer mechanism 36 and the magazine transfer and clamping mechanism 32 are dwelling. At this time the notches 80 of the exposed work piece carrier are engaged with the tangs 78 of the magazine 12. Approximately simultaneously with the foregoing, the exposure actuating studs 156 contact and close a preselected switch in the switch bank 40. Toward the end of its upward travel, FIGS. 11 and 11A, the cams 160—160 at opposite sides of the special master engage the under side of the forward end of the pawls 253 of mechanism 32 lifting the pawls upwardly a slight distance.

From 180° to 270° driving pawls 258 of the magazine transfer and clamping mechanism 32 move forward riding up over the camming lugs 160, camming the pawls 258 in between two of the teeth of the rack 90 on the magazine 12 and thereafter permitting the pawls to move the magazine rightwardly to bring the depending hooks 88 of a fresh work piece carrier 14 into interfitting or mating engagement with the upwardly projecting members 162.

At the end of the forward movement of the pawls 258, from 270° to 360°, the lifter arms 344 descend causing the special master 158 to pull the fresh work piece carrier 14 downwardly into exposure position between the members 216 on the contact print frame 214.

The main drive pawls 392 and 394 now move the negative carriage to present the first negative carrier 20 to the lifter arms 344. Meanwhile the radius arms 245 retract rearwardly. The lifter arms 344 rise carrying the negative carrier 20 into exposure position in the exposure area 28. As before stated herein, the process is thereafter repeated until the negative carriers 20 have each been exposed.

*Electrical Control Circuit*

Figure 13:
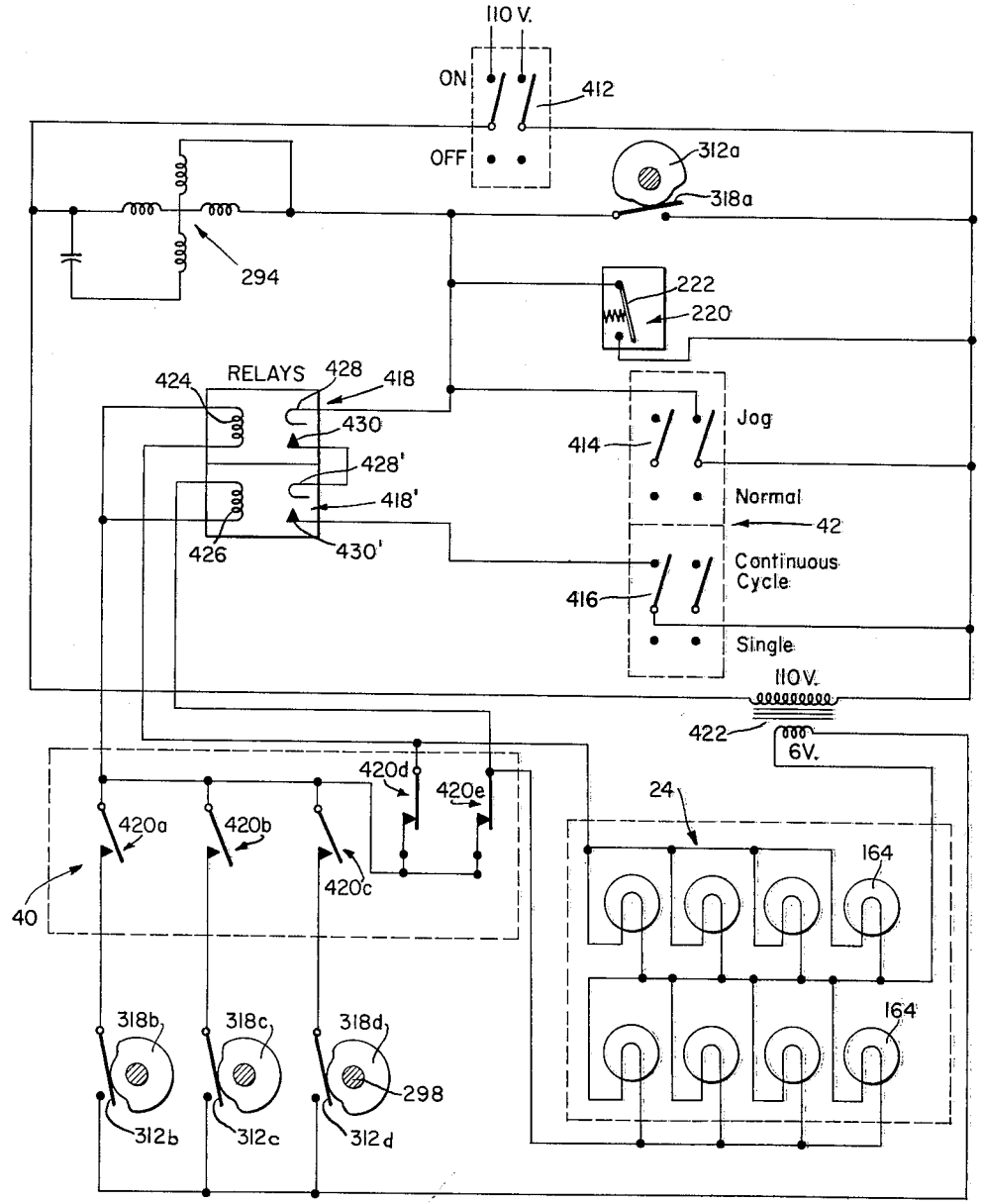
FIG. 13 is an electrical circuit diagram for the present invention.

In the simplified circuit diagram of FIG. 13, there is illustrated various operating elements having to do with the electrical control aspects of the present invention. The control switches 42 of FIG. 1 are individually identified in FIG. 13 as 412, on-off), 414 (jog-normal), and 416 (continuous-single) respectively, together with relays 418–418′, leaf switches 420a through 420f of switch bank 40—the unidentified switch in FIG. 2 being a spare—and the interval timing control microswitches 318a through 318d, provide means, as will now be described, for automatically and/or manually controlling the electromechanical functions of the apparatus including exposing the photosensitized work pieces to light, in the manner hereinbefore described, as desired.

The drive motor 294 may be energized over a plurality of circuits including relays 418–418′ from the 110 v. line upon closure of line switch 412. For example, cam switch 318a which is opened and closed by cam 312a on the main drive shaft 298, when closed will energize the motor as will the piece plate microswitch 220 when closed by a work piece carrier member, FIGS. 3 and 9A. The "jog-normal" toggle switch 414 when in the "jog" position also completes an electrical circuit to the motor as does the "continuous-single" switch 416 when in the "continuous" position.

The piece plate microswitch 220 together with the adjustable cam actuated microswitch 318a which is normally open, are electrically interconnected so that during the time when a work piece is within the hangers 216 the piece plate switch 220 will be closed up to the time when the exposure studs on the negative carrier member engage certain of the exposure control leaf switches 420a through 420e as earlier described herein, to cause the lamps in the lamp house 24 to be energized and thereby expose the work piece to light. The cam actuated switch 318a thus provides a means for maintaining the drive motor in an energized condition until such time as a selected negative has been raised into the exposure area. It is to be noted that cam 312a is provided with a gap—each cam in this group being adjustable—that corresponds in time duration to the period during which the work piece is down in position i.e., in the exposure area 28 for the exposure.

The two relays 418–418′ provide automatic control over the drive motor 294 when unbalance between upper and lower banks of lamps 164 exists, i.e., whenever a lamp is burned out. The coils 424–426 of the relays are connected in series with the normally closed leaf switches 420d and 420e in the lamp circuit and are normally shorted out of the lamp circuit by the series of negative masters which have data thereon to be photo-exposed.

The "special master" however, when it is raised from the negative magazine, in order to advance the work piece magazine and withdraw a work piece carrier therefrom, opens leaf switches 420d and 420e by means of the two leftmost of three switch actuating studs 156 therein. Only two of these studs are shown in FIG. 4. Thus when the usual cyclic exposure is made, a preselected one of the three normally open interval timing cam microswitches 318b, 318c and 318d is closed energizing the lamps 164 and introducing the relay coils 424–426 into the lamp circuit in series therewith. Dividing the lamps into two banks reduces the total number of lamps in circuit with each relay coil. Each relay coil is sensitivity adjusted to close at 100% of the total current thereacross, i.e., when four lamps are energized, and will remain open if the current drops to 75% as would be the case if less than all four of the lamps in either lamp bank are energized. For example, if one lamp is out, then only 75% of the maximum current will flow through the relay and the relay remains de-energized.

The contacts 428–430, 428′–430′ of the relays are in series with the toggle switch 416 ("continuous"-position) and provides a path for energization of the motor 294 when cam switch 318a is momentarily opened. As beforementioned, switch 220 keeps the motor energized for the full cycle for any particular work piece carrier within the contact printing piece frame 216. When the special master lifts the finished work piece carrier out of the contact printing frame and replaces it within the work piece magazine, cam switch 318a is then automatically placed in the circuit to the motor to keep the motor running until the exposure time. At the time corresponding to the exposure period, which normally occurs at practically the same time as that during which the piece plate would normally be exposed if it were down in position, microswitch 318a is de-energized. At this moment, a test is made to determine whether or not any of the lamps 164 in the lamp bank 24 are burned out. In order for the motor to be kept running, the energizing circuit includes the contacts 428–430 and 428′–430′ of relays 418–418′ which close, bridging the gap created by the de-energization of cam switch 318a. If the relay operates due to the fact that all of the lamps are lit, then the circuit to the drive motor is complete. If however, one of the lamps is burned out, reducing the current to the relay, the relay becomes inoperative and the electrical circuit to the drive motor is opened causing the drive motor to stop. The operator is thus apprised that a lamp is defective or burned out. In those instances where it is desirable or necessary to energize the motor even though a lamp may be burned out, recourse is had to the "jog-normal" switch 414 which in its closed condition overrides the relay circuit and energizes the motor permitting the operation of the apparatus to continue.

Toggle switch 416 when open gives only a single piece operation, thereafter stopping the motor just as though a lamp had burned out. Additional single piece operation can be initiated by momentarily "jogging" switch 414. If switch 414 is left continuously on "jog," the motor continues to run indefinitely but without the benefit of the interlock features of microswitch 318a, piece plate switch 220 or toggle switch 416. It is apparent therefore that the microswitch 220 prevents motor operation unless there is a work piece in the contact printing frame provided the other controls are operated such as toggle switch 416 being opened. Cam actuated switches 318b, 318c and 318d are preset to such time intervals as are proper for the different negative masters being used in order to give constant density of exposure with varying negative density. Leaf switches 420a through 420e are selected and only one is used by each negative master, as required, and are held closed to allow the passage of current to the corresponding one of the microswitches 318 through 318b in circuit therewith.

What is claimed is:

1. Photographic printing apparatus comprising, a light-tight enclosure including an exposure area thereon, a main driving mechanism, a work piece magazine for holding a plurality of photo-sensitized work pieces, means coupled to said driving mechanism engageable with said magazine for moving said magazine relative to said exposure area, a negative magazine for holding a plurality of negatives, means coupled to said driving mechanism and engageable with said magazine for moving the latter relative to said exposure area, means in said negative magazine operatively engageable with the means coupled to said driving mechanism for engaging and removing a work piece from said work piece magazine and positioning the same in said exposure area of said photographic apparatus, said last named means being coupled to said driving mechanism and operable to engage and remove a negative from said negative magazine and position the same in register with said work piece in said exposure area, a movable source of illumination for exposing said work piece to light, means carried by each negative and engageable with said source of illumination for moving the latter to a separate discrete position characteristic of the respective negative whereby said work piece may receive a plurality of latent images thereon corresponding to a plurality of negatives carried by said negative magazine.

2. Photographic apparatus comprising, a light-tight housing having a planar exposure area, a first carriage, a plurality of stencil negatives in said first carriage, said first carriage being movable relative to said housing, a second carriage, a plurality of photosensitized work pieces in said second carriage, said second carriage being movable relative to said housing, a source of actinic light disposed adjacent said exposure area in said housing, said light source being movable in two directions in a plane parallel to said exposure area, a drive mechanism for said apparatus, said drive mechanism including means operatively engageable with said first and second carriages, for positioning a stencil negative member in contact relation with a photo-sensitized work piece within said exposure area, means operatively associated with each stencil bearing member and engageable with said light source and responsive to the movement of said drive means for positioning said light source adjacent said negative and said work piece, and means for energizing said source of light thereby to expose the photo-sensitized work piece through the negative thus to produce a latent image of said stencil negative on said photonsensitized work piece.

3. Photographic apparatus comprising, a light-tight housing provided with an access opening in one portion thereof adjacent to an exposure area located therewithin, a main driving mechanism in said housing, a movable light-tight magazine carried by said housing and adapted to be moved relative to said access opening, a plurality of disengageably removable photo-sensitized members carried by said magazine, means coupled to said main driving mechanism and engageable with said light-tight magazine for moving the same during a cycle of operation of said apparatus, a movable stencil-negative magazine receivable within said housing, a plurality of disengageably removable negative members carried by said magazine, means coupled to said main driving mechanism and engageable with said negative magazine for moving the latter relative to said housing and to said exposure area, means in said housing coupled to said main driving mechanism and engageable with each of said negative carrying members and adapted during each cycle of operation of said apparatus to remove one of said negatives from said magazine and position the same in said exposure area, means demountably carried in said negative carriage engageable with said last named means in said housing and adapted during a cycle of operation of said apparatus to withdraw a photo-sensitized member from said light-tight carriage and position the same in said exposure area in register with said negative member, a movable light source within said housing, means on each of said negative members engageable with said movable light source and operable upon engagement therewith during movement of said negative member in one direction for positioning said light source relative to said exposure area, and means operable conjointly with said main driving mechanism for engaging said light source for exposing said photo-sensitized member to light thereby producing a latent image of said negative on said photo-sensitized member.

4. Photographic apparatus comprising, a light-tight housing having an access opening therein leading to an exposure area within said housing, a main driving mechanism for said apparatus located within said housing, a movable light-tight magazine located externally of said housing and movable thereover, a plurality of photo-sensitized members detachably carried by said magazine and receivable through said access opening for location within said exposure area, means coupled to said main driving mechanism and cyclically engageable with said magazine for moving the same relative to said access opening whereby to position a photo-sensitized member adjacent thereto, a removable negative carrying magazine rectilinearly movable within said housing, means coupled to said main driving mechanism cyclically engageable with said magazine for moving the latter relative to said housing during each cycle of operation of said apparatus thus to position each negative in turn adjacent to said exposure area, means coupled to said main driving mechanism engageable with respective ones of said negative carrying members for moving said negative members into said exposure area and into register with said photonsensitized work piece, means operatively associated with said first mentioned magazine moving means for bringing said photosensitized member into contact printing relation with said negative bearing member, a movable light carrying assembly including a plurality of sources of illumination, means connecting said sources of illumination to a source of electrical energy, means on each of said negative carrying members operatively engageable with said light carrying assembly for positioning the latter relative to said exposure area, and means operatively associated with said main driving mechanism for time controlling the energization of said sources of illumination whereby to cause said sources of illumination to produce a latent image of said negative on the selected photosensitized member.

5. The invention in accordance with claim 4 wherein said last named means includes a plurality of exposure interval timing cams and associated switches interconnected with said source of illumination.

6. Photographic apparatus comprising, a light-tight housing, a contact printing frame in said housing and including an exposure area therefor, drive means in said housing, means for energizing and moving said drive means, a work piece magazine movable relative to said housing and adapted to detachably engageably support a plurality of photosensitized work pieces in parallel side by side spaced apart relation therein, means coupling said drive means to said work piece magazine for moving the latter in response to energization of said drive means, a negative magazine movable relative to said housing and being adapted to detachably engageably support a plurality of negatives in parallel side by side spaced apart relation therein, a first and a second means operatively engageable with said negative magazine for moving the latter back and forth within said housing thereby to position each negative relative to said exposure area within said housing, means operatively coupling said first and second moving means to said drive means thereby effecting movement of the negative magazine in response to energization of said drive means, means operatively coupled to said drive means and movable thereby to withdraw a negative from said negative magazine and position the same adjacent said contact printing frame within said exposure area, means in said negative carriage operatively engageable with said last named means and movable thereby to withdraw a work piece from said work piece magazine and position the same within said printing frame in said exposure area, said work piece magazine driving means including means for registering said work piece and said negative in said exposure area in contact printing relationship, a source of illumination movable in two directions in a plane parallel to but spaced apart from said contact printing frame in and constant focus with said exposure area, means connecting said source of illumination to a source of electrical energy for energizing the same, means on each negative operatively engageable with said source of illumination for moving the latter in response to movement of the former to position said source of illumination at a discrete location adjacent said exposure area and said contact printing frame, and, a plurality of exposure time controlling means operable conjointly with said drive mechanism and operatively associated with said source of illumination for controlling the energization thereof thereby to expose said selected work piece to said source of illumination thus to create a latent image of said negative thereon.

7. Photographic printing apparatus comprising, (a) a light-tight enclosure including an exposure area therein,
(b) a photographic work piece magazine,
(c) a negative magazine,
(d) a light source for said apparatus,
(e) means mounting said light source for automatic movement angularly about a plane parallel with said exposure area,
(f) means for simultaneously moving one or more work pieces from said work piece magazine to said exposure area,
(g) means for moving a negative bearing one or more negative images from said negative magazine into said exposure area,
(h) each of said negatives including means operably, engageable with said light source mounting means effective to cause said light source to move angularly about a plane parallel with said work piece whereby discrete elemental portions of said exposure area may be illuminated when said light source is energized,
(i) means for registering the image or images of said negative with respective ones of said work pieces in contact printing relationship in said exposure area, and
(j) means to energize said light source to expose said work pieces to said negative thus to produce a latent image of said negative on said one or more workpieces, at the discrete areas to which said light source has been moved.

8. The invention in accordance with claim 7 wherein said light source mounting means comprises,
(a) a parallel bar mechanism including upper and lower, front and rear positioning arms and means operably associated therewith engageable by said negative in a manner causing said light source automatically to be positioned angularly with respect to said negative image effective to cause light from said source to penetrate said negative and produce a latent image upon said work piece at a discrete predetermined position.

9. Photographic printing apparatus comprising,
(a) a light-tight enclosure having a planar exposure area therein,
(b) a work piece magaizne holding a plurality of light sensitized work pieces,
(c) a negative magazine,
(d) a plurality of negatives in said magazine,
(e) a light source,
(f) means for directing light from said source into said exposure area,
(g) means mounting said light source for automatic angular movement about a plane adjacent to and parallel with said exposure area effective thereby to expose individual discrete areas of said exposure area,
(h) cyclically operable drive means for moving a work piece from said work piece magazine into said exposure area,
(i) means for moving a negative from said negative magazine into said exposure area,
(j) each said negative including means automatically engageable with said light source moving means effective upon engagement therewith to automatically move said light source into a selected position to expose a discrete portion of said work piece when said light source is energized, and
(k) means for energizing said light source thereby to produce a latent image of said negative on said work piece.

10. Photographic printing apparatus comprising,
(a) a light-tight enclosure including a planar exposure area therein,
(b) a photographic work piece magazine,
(c) a plurality of photo-sensitive work pieces in said magazine,
(d) a negative magazine,
(e) a plurality of negatives in said magazine,
(f) a light source,
(g) means mounting said light source for automatic movement about a plane parallel with said exposure area,
(h) means for moving a work piece from said work piece magazine into and out of said exposure area,
(i) means for moving a negative from said negative magazine into and out of said exposure area,
(j) means on said negative engageable with said light source moving means and operable to move said light source into a position selected by said means on said negative and effective when said light source is energized to expose a discrete area of said negative in said exposure area, and
(k) means for energizing said light source thereby to produce a latent image of said negative on said work piece.

11. Photographic printing apparatus comprising,
(a) a light-tight enclosure including a planar exposure area therein,
(b) a photographic work piece magazine including a photo-sensitized work piece therein,
(c) a negative magazine including a negative therein,
(d) a light source,
(e) means mounting said light source for movement in a plane parallel with said exposure area,
(f) means for moving said work piece from said work piece magazine into said exposure area,
(g) means for moving said negative from said negative magazine into said exposure area,
(h) said negative including cam means operably, engagable with said means for moving said light source effective upon engagement of said cam means therewith to position said light source so as to expose a discrete portion of said negative in said exposure area when said light source is energized,
(i) means for registering said negative and said work piece relative to each other adjacent said exposure area, and
(j) means for energizing said light source thereby to produce a latent image of said negative on said work piece.

12. Photographic printing apparatus comprising,
(a) a light-tight enclosure including a planar exposure area therein,
(b) a photographic work piece magazine,
(c) means removably mounting a plurality of photo-sensitized work piece carrying members thereon,
(d) a negative magazine,
(e) means removably mounting a plurality of negative carrying members therein,
(f) a multi-chambered light source,
(g) means for energizing said light source,
(h) means mounting said light source for automatic movement in a plane parallel with said exposure area,
(i) means for moving a work piece carrying member from said work piece magazine into said exposure area,
(j) means for moving a negative carrying member from said negative magazine into said exposure area,
(k) means on said negative carrying member operably engageable with said light source moving means for automatically positioning said light source adjacent preselected discrete areas of said work piece for exposure thereof when said light source is energized,
(l) and demountable, adjustably, positionable, means carried by said negative carrying member operably, engageable with said light source energizing means for energizing the same thereby to produce a latent image of said negative on said work piece.

13. Photographic printing apparatus comprising:
(a) a light-tight enclosure including an exposure area therein,
(b) a main drive mechanism,
(c) means for coupling said drive mechanism to a source of power,
(d) a photographic work piece magazine,
(e) means detachably coupling said work piece magazine to said main drive mechanism,
(f) a negative magazine,
(g) means detachably coupling said negative magazine to said drive mechanism,
(h) a light source for said apparatus,
(i) means to selectably time energize said light source,
(j) means mounting said light source for movement about a plane parallel with said exposure area,
(k) means for moving a work piece from said work piece magazine into said exposure area,
(l) means for moving a negative from said negative magazine into said exposure area,
(m) means carried by said negative engageable with said means to selectably time energize said light source and operable when energized thereby to expose said work piece for a preselected length of time in response to the density of the negative image.
(n) means operatively associated with said main drive mechanism to energize said light source, thereby to produce a latent image in said exposure area of said negative on said work piece.

14. Photographic printing apparatus comprising,
(a) a light-tight enclosure having a planar exposure area therein,
(b) a work piece magazine holding a plurality of light sensitized work pieces,
(c) a negative magazine,
(d) a plurality of negatives in said magazine,
(e) a light source,
(f) means for directing light from said source onto various portions of said exposure area,
(g) means mounting said light source for automatic angular movement in a plane adjacent to and parallel with said exposure area,
(h) cyclically operable drive,
(i) means for moving said negative magazine relative to said work piece magazine in a preselected automatic timed sequence,
(j) means operably coupled to said drive,
(k) means for moving a work piece from said work piece magazine into said exposure area,
(l) means for moving a negative from said negative magazine into said exposure area,
(m) means operably associated with said cyclically operably drive,
(n) means for registering said negative and said work piece in said exposure area,
(o) means for selectively orienting said light source relative to said negative image, and
(p) for energizing said light source thereby to produce a latent image of a discrete portion of said negative on said work piece.

15. Photographic printing apparatus comprising,
(a) a light-tight enclosure including a planar exposure area therein,
(b) a photographic work piece magazine,
(c) said magazine including a substantially rectangular hollow member having side and end walls, a bottom wall and being open at the top,
(d) a demountable, slidably movable, member operably engageable with said hollow member for sealing the top thereof,
(e) a plurality of spaced apart members along opposite side walls of said enclosure forming work piece carrier receiving slots,
(f) resilient means adjacent each slot in interfering relation with one end thereof for demountably, engaging a work piece carrier when the latter is received in said magazine,
(g) drive means for said magazine on said opposite parallel edge portions thereof,
(h) a plurality of work piece carriers including one or more photosensitive work pieces in said magazine,
(i) a negative magazine,
(j) a plurality of negatives in said magazine,
(k) a light source,
(l) means mounting said light source for automatic angular movement in a plane parallel with said exposure area,
(m) means for moving a work piece carrier including one or more work pieces from said work piece magazine into and out of said exposure area,
(n) means for moving a negative carrier including one or more negatives from said negative magazine into and out of said exposure area,
(o) means for registering the image of said negative or negatives with corresponding work pieces,
(p) means operably associated with said registering means for immobilizing said negatives and said work pieces while so registered, and
(q) means for energizing said light source thereby to produce an image of said negative or negatives on said work piece.

16. Photographic printing apparatus comprising,
(a) a light-tight enclosure including a planar exposure area therein,
(b) a photographic work piece magazine,
(c) said magazines including a substantially rectangular hollow member having side and end walls, a bottom wall and being open at the top,
(d) a demountable, slidably, movable, member operably engageable with said hollow member for sealing the top thereof,
(e) a plurality of spaced apart members along opposite side walls of said enclosure forming work piece carrier receiving slots,
(f) resilient means adjacent each slot in intererfering relation with one end thereof for demountably engaging a work piece carrier when the latter is received in said magazine,
(g) drive means for said magazine on opposite parallel edge portions thereof including oppositely, disposed elongated members each bearing a plurality of notches and projections therein,
(h) a plurality of work piece carriers including one or more photo-sensitive work pieces in said magazine,
(i) a negative magazine,
(j) one or more negatives in said magazine,
(k) a plurality of light sources,
(l) means mounting said light sources for conjoint automatic angular movement in a plane parallel with said exposure area,
(m) means for moving a work piece carrier including one or more work pieces from said work piece magazine into and out of said exposure area,
(n) means in said exposure area for indicating the presence or absence of a work piece carrier in said exposure area,
(o) means for moving a negative carrier including one or more negatives from said negative magazine into and out of said exposure area, when said indicating means indicates that a work piece is in said exposure area,
(p) means for registering the image of said negative or negatives with corresponding work pieces,
(q) means operably associated with said registering means for immobilizing said negatives and said work pieces while so registered, and (r) means for energizing said light source thereby to produce an image of said negative or negatives on said work piece.

17. Photographic printing apparatus comprising, a light-tight enclosure including a planar exposure area therein, a photographic work piece magazine, means removably mounting a plurality of photosensitized work piece carrying members thereon, a negative magazine, means removably mounting a plurality of negative carrying members therein, a light source, means mounting said light source for substantially circular movement in a plane parallel with said exposure area effective thereby to illuminate discrete elemental areas of said exposure area in accordance with a predetermined pattern of exposure, means for moving a work piece carrying member from said work piece magazine into said exposure area, means for moving a negative carrying member from said negative magazine into said exposure area, and, cam means on each of said negative carrying members engageable with said light source mounting means for moving the latter in response to movement of the former and for energizing said light source.

References Cited in the file of this patent

UNITED STATES PATENTS

| | | |
|---|---|---|
| 33,500 | Stock | Oct. 15, 1861 |
| 2,371,925 | Schade | Mar. 20, 1945 |
| 2,426,092 | Grogan | Aug. 19, 1947 |
| 2,654,300 | Baker | Oct. 6, 1953 |
| 2,657,613 | Maker | Nov. 3, 1953 |